(12) United States Patent
Oh

(10) Patent No.: US 12,010,427 B2
(45) Date of Patent: Jun. 11, 2024

(54) CAMERA DEVICE

(71) Applicant: LG INNOTEK CO., LTD., Seoul (KR)

(72) Inventor: Jung Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 244 days.

(21) Appl. No.: 17/593,901

(22) PCT Filed: Mar. 17, 2020

(86) PCT No.: PCT/KR2020/003645
§ 371 (c)(1),
(2) Date: Sep. 27, 2021

(87) PCT Pub. No.: WO2020/197150
PCT Pub. Date: Oct. 1, 2020

(65) Prior Publication Data
US 2022/0191359 A1  Jun. 16, 2022

(30) Foreign Application Priority Data

Mar. 28, 2019  (KR) .................. 10-2019-0035661

(51) Int. Cl.
*H04N 23/68* (2023.01)
*H04N 23/51* (2023.01)
(Continued)

(52) U.S. Cl.
CPC ........... *H04N 23/687* (2023.01); *H04N 23/51* (2023.01); *H04N 23/54* (2023.01); *H04N 23/55* (2023.01)

(58) Field of Classification Search
CPC ........ H04N 23/51; H04N 23/54; H04N 23/55; H04N 23/685; H04N 23/687
See application file for complete search history.

(56) References Cited

U.S. PATENT DOCUMENTS

2006/0284495 A1  12/2006  Seo et al.
2011/0097061 A1  4/2011  Lee et al.
(Continued)

FOREIGN PATENT DOCUMENTS

CN  105899990 A  8/2016
CN  107407788 A  11/2017
(Continued)

OTHER PUBLICATIONS

International Search Report dated Jul. 2, 2020 in International Application No. PCT/KR2020/003645.
(Continued)

*Primary Examiner* — Daniel M Pasiewicz
(74) *Attorney, Agent, or Firm* — Saliwanchik, Lloyd & Eisenschenk

(57) ABSTRACT

The present embodiment relates to a camera device including a magnet and a coil. The magnet includes: a first magnet disposed on each of first and second side surfaces of a camera module, and having a different polarity in a top portion and a bottom portion of the surface facing the coil; and a second magnet disposed on each of third and fourth side surfaces of the camera module, and having a different polarity on both side portions of the surface facing the coil. The coil includes: a first coil facing the first magnet; a second coil facing the first magnet and electrically isolated from the first coil; and a third coil facing the second magnet and electrically isolated from the first and second coils.

20 Claims, 19 Drawing Sheets

(51) Int. Cl.
   *H04N 23/54*     (2023.01)
   *H04N 23/55*     (2023.01)

(56) References Cited

U.S. PATENT DOCUMENTS

| 2017/0155816 | A1 | 6/2017 | Ito et al. |
| 2018/0329275 | A1 | 11/2018 | Endo |
| 2019/0141248 | A1* | 5/2019 | Hubert ................ H04N 23/687 |

FOREIGN PATENT DOCUMENTS

| CN | 108351484 A | 7/2018 |
| CN | 108474923 A | 8/2018 |
| JP | 2014-98787 A | 5/2014 |
| JP | 2016-122055 A | 7/2016 |
| JP | 2017-107190 A | 6/2017 |
| JP | 2018-194587 A | 12/2018 |
| KR | 10-2006-0131676 A | 12/2006 |
| KR | 10-2009-0084494 A | 8/2009 |
| KR | 10-2010-0066678 A | 6/2010 |
| KR | 10-2011-0045343 A | 5/2011 |
| KR | 10-2018-0033959 A | 4/2018 |
| KR | 10-2018-0098078 A | 9/2018 |

OTHER PUBLICATIONS

Office Action dated Mar. 22, 2023 in Chinese Application No. 202080024617.0.
Supplementary European Search Report dated Mar. 3, 2023 in European Application No. 20779496.7.
Office Action dated Mar. 5, 2024 in Japanese Application No. 2021-556266.
Office Action dated Apr. 15, 2024 in Chinese Application No. 202080024617.0.
Office Action dated May 1, 2024 in Korean Application No. 10-2019-0035661.

* cited by examiner

CAMERA DEVICE

CROSS-REFERENCE TO RELATED APPLICATIONS

This application is the U.S. national stage application of International Patent Application No. PCT/KR2020/003645, filed Mar. 17, 2020, which claims the benefit under 35 U.S.C. § 119 of Korean Application No. 10-2019-0035661, filed Mar. 28, 2019, the disclosures of each of which are incorporated herein by reference in their entirety.

TECHNICAL FIELD

The present embodiment relates to a camera device.

BACKGROUND ART

As various portable terminals are widely spread and commonly used, and the wireless Internet services have been commercialized, the demands of consumer related to portable terminals have been diversified and various kinds of additional devices have been installed in portable terminals.

Among them, there is a camera device for photographing a subject as a photograph or a moving picture. Meanwhile, a camera device in recent years has been applied with a hand-shake correction function that inhibits an image from being shaken due to hand-shake of a photographer.

However, the x-axis/y-axis direction lens shift used in the conventional hand-shake correction module has limitations in correcting various kinds of shaking.

DETAILED DESCRIPTION OF THE INVENTION

Technical Subject

The present embodiment is intended to provide a camera device capable of correcting hand-shake for x-axis direction shift, y-axis direction shift, and rotation about the z-axis.

In addition, it is intended to provide a camera device in which hand shake correction through a lens and hand shake correction through an image sensor are performed together.

Technical Solution

The camera device according to the present embodiment comprises: a holder; a substrate disposed on the holder; a coil disposed on the substrate; a base disposed to be spaced apart from the holder; a magnet disposed on the base and facing the coil; and an image sensor coupled to the base, wherein the substrate comprises first to fourth corners, wherein the coil comprises a first coil disposed at the first corner of the substrate, a second coil disposed at the second corner of the substrate, and a third coil disposed at a third corner, and a fourth coil disposed at the fourth corner of the substrate, wherein a long side of the first coil and a long side of the third coil are disposed parallel to each other, a long side of the second coil and a long side of the fourth coil are disposed parallel to each other, and a long side of the first coil and a long side of the second coil may be disposed not to be parallel to each other.

The long side of the first coil and the long side of the second coil may be disposed such that virtual extension lines thereof are orthogonal to each other.

Currents may be independently applied to at least three among the first to fourth coils.

The first to fourth coils may be electrically isolated from one another.

The camera device may further comprise: a terminal portion comprising a terminal electrically connected to a terminal of the image sensor and disposed on the base; and a plurality of wires connecting the substrate and the terminal portion.

The camera device may further comprise an image sensor substrate on which the image sensor is disposed, wherein the image sensor substrate is coupled to the terminal portion and the terminal portion is coupled to the base so that the image sensor can be coupled to the base.

The plurality of wires may comprise a number of wires corresponding to the number of terminals of the image sensor.

The plurality of wires may comprise a total of 24 wires, 6 between adjacent corners among the four corners of the base.

The magnet may comprise: a first magnet facing the first coil and disposed at a first corner of the base; a second magnet facing the second coil and disposed at a second corner of the base; a third magnet facing the third coil and disposed at a third corner of the base; and a fourth magnet facing the fourth coil and disposed at a fourth corner of the base.

The base comprises a first side surface and a second side surface disposed opposite to each other, and a third side surface and a fourth side surface disposed opposite to each other between the first side surface and the second side surface, wherein the first corner of the base is disposed between the first side surface and the third side surface, the second corner of the base is disposed between the third side surface and the second side surface, the third side surface of the base a corner is disposed between the second side surface and the fourth side surface, and the fourth corner of the base is disposed between the fourth side surface and the first side surface, and wherein the polarity of the surface facing the coil of the first magnet is different from a portion close to the first side surface and a portion close to the second side surface, and the polarity of a surface of the second magnet facing the coil may be different between a portion close to the third side surface and a portion close to the fourth side surface.

Any one of a forward current and a reverse current may be selectively applied to each of the four coils.

The camera device according to the present embodiment comprises an optical module for performing a hand-shake correction function; an image sensor disposed in alignment with the optical module; and an actuator for driving the image sensor, wherein the actuator can move the image sensor in a first direction perpendicular to the optical axis, move in a second direction perpendicular to the optical axis and the first direction, and rotate based on the optical axis.

The optical module may comprise one or more of a liquid lens and a MEMS actuator.

A camera device according to the present embodiment comprises: a base assembly comprising an image sensor; a holder assembly comprising a lens and spaced apart from the base assembly; a coil disposed on the holder assembly; a magnet disposed on the base assembly and facing the coil; and a plurality of elastic members connecting the base assembly and the holder assembly, wherein the plurality of elastic members may be electrically connected to the image sensor.

Advantageous Effects

Through the present embodiment, an x-axis direction shift, a y-axis direction shift, and a rotation about the z-axis corresponding to hand-shake may be performed with respect to the image sensor.

In addition, hand-shake correction for the image sensor and hand-shake correction for a corresponding lens can be performed together.

Through this, it is possible to provide a more enhanced hand-shake correction function.

BRIEF DESCRIPTION OF DRAWINGS

FIG. 10 and FIG. 11 are exploded perspective views of a partial configuration of the camera device according to the present embodiment when viewed from a different direction than that of FIG. 9a.

BEST MODE

Figure 1:
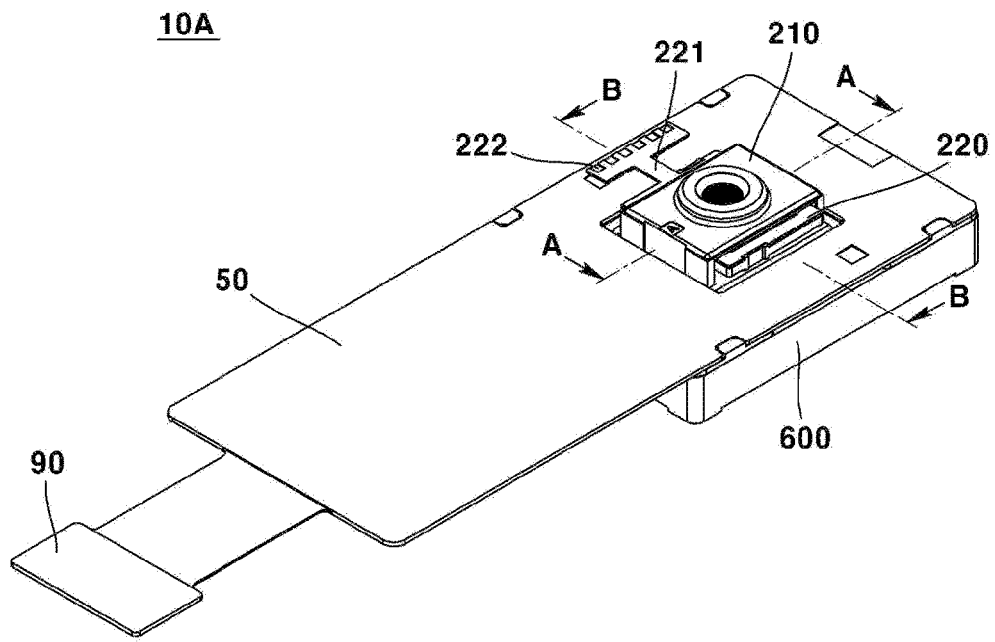
FIG. 1 is a perspective view of a camera device according to the present embodiment.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

An 'optical axis (refer to OA of FIG. 4) direction' used hereinafter is defined as an optical axis direction of a lens and/or an image sensor coupled to the lens driving device.

The 'vertical direction' used hereinafter may be a direction parallel to the optical axis direction. The vertical direction may correspond to the 'z-axis direction (refer to FIG. 4)'. The 'horizontal direction' used below may be a direction perpendicular to the vertical direction. That is, the horizontal direction may be a direction perpendicular to the optical axis. Accordingly, the horizontal direction may comprise an 'x-axis direction' and a 'y-axis direction' (refer to FIG. 4).

The 'autofocus function' used hereinafter is defined as a function of automatically focusing on the subject by adjusting the distance from the image sensor by moving the lens in the optical axis direction according to the distance of the subject so that a clear image of the subject can be obtained on the image sensor. Meanwhile, 'auto focus' may correspond to 'AF (Auto Focus)'.

A 'hand-shake correction function' used hereinafter is defined as a function of moving a lens and/or an image sensor to offset vibration (movement) generated in the image sensor by an external force. Meanwhile, 'hand-shake correction' may correspond to 'optical image stabilization (OIS)'.

Hereinafter, the configuration of the camera device will be described with reference to the drawings.

Figure 2:
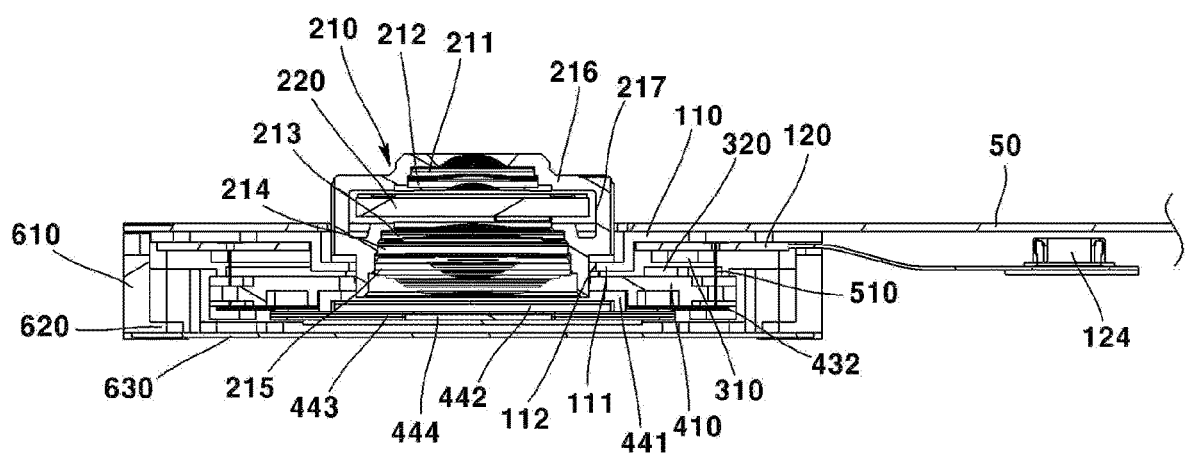
FIG. 2 is a cross-sectional view viewed from A-A of FIG. 1.
Figure 3:
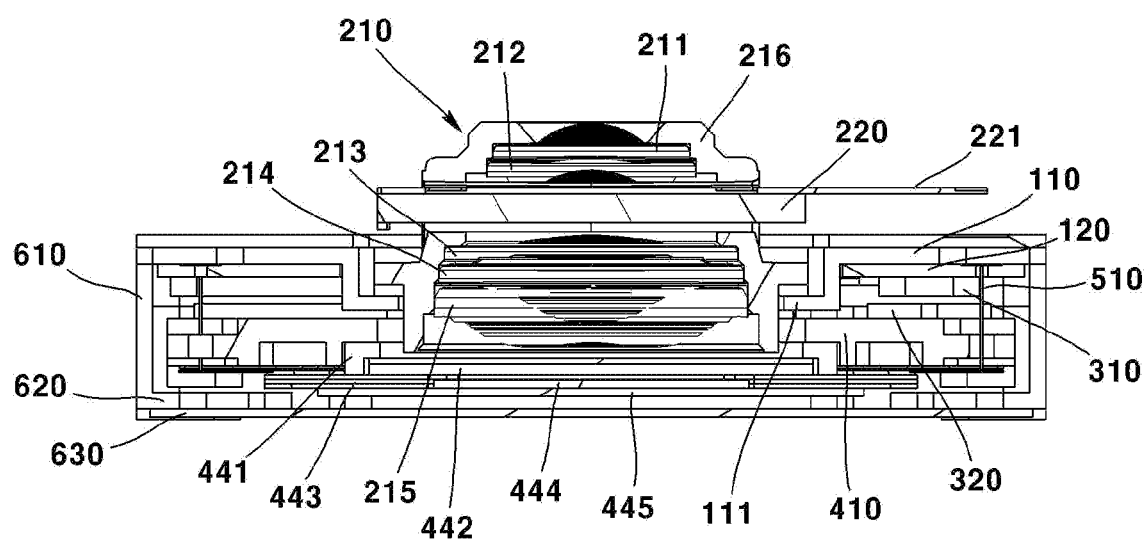
FIG. 3 is a cross-sectional view viewed from B-B of FIG. 1.
Figure 4:
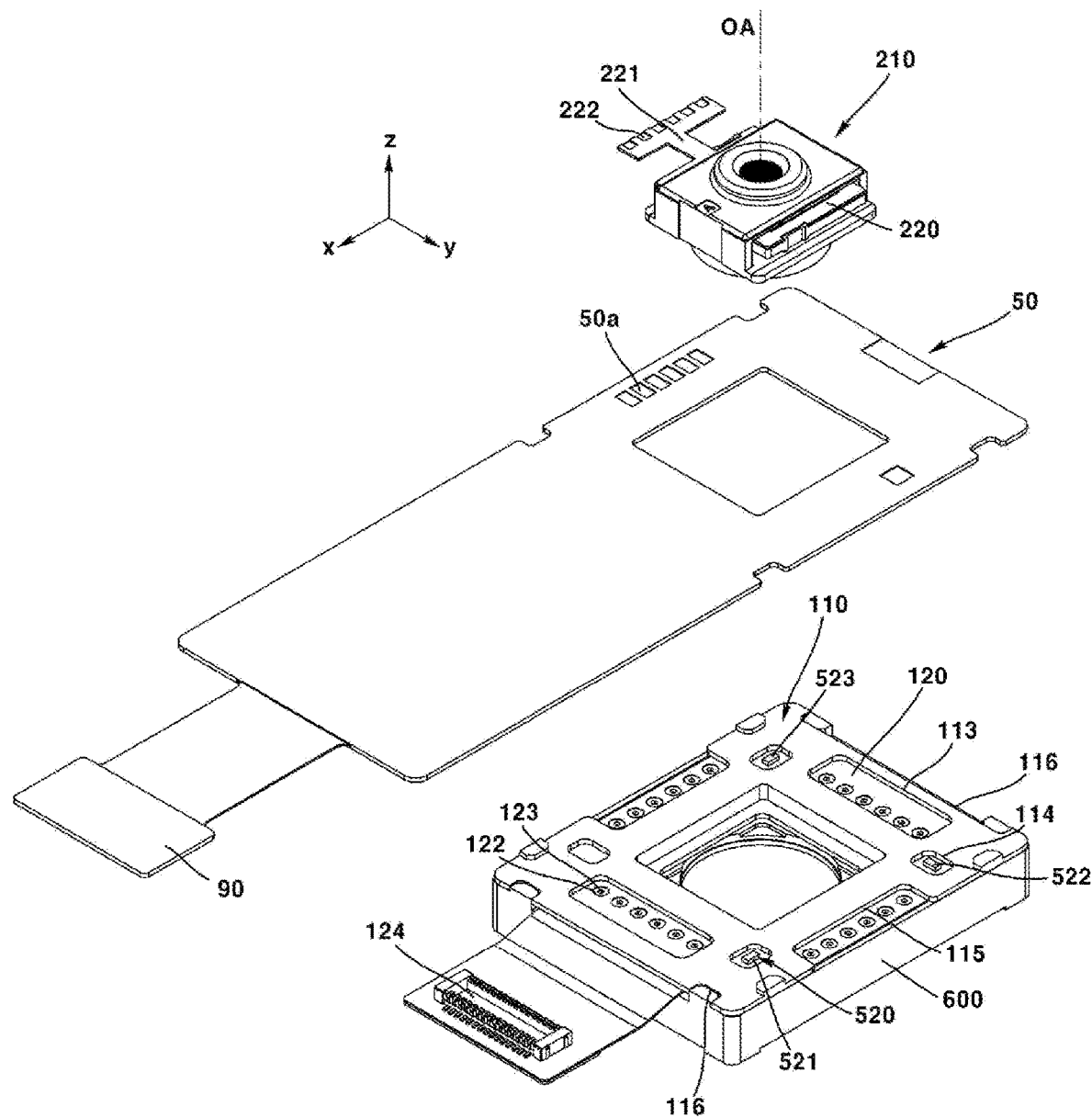
FIG. 4 is an exploded perspective view of a partial configuration of the camera device according to the present embodiment.
Figure 5:
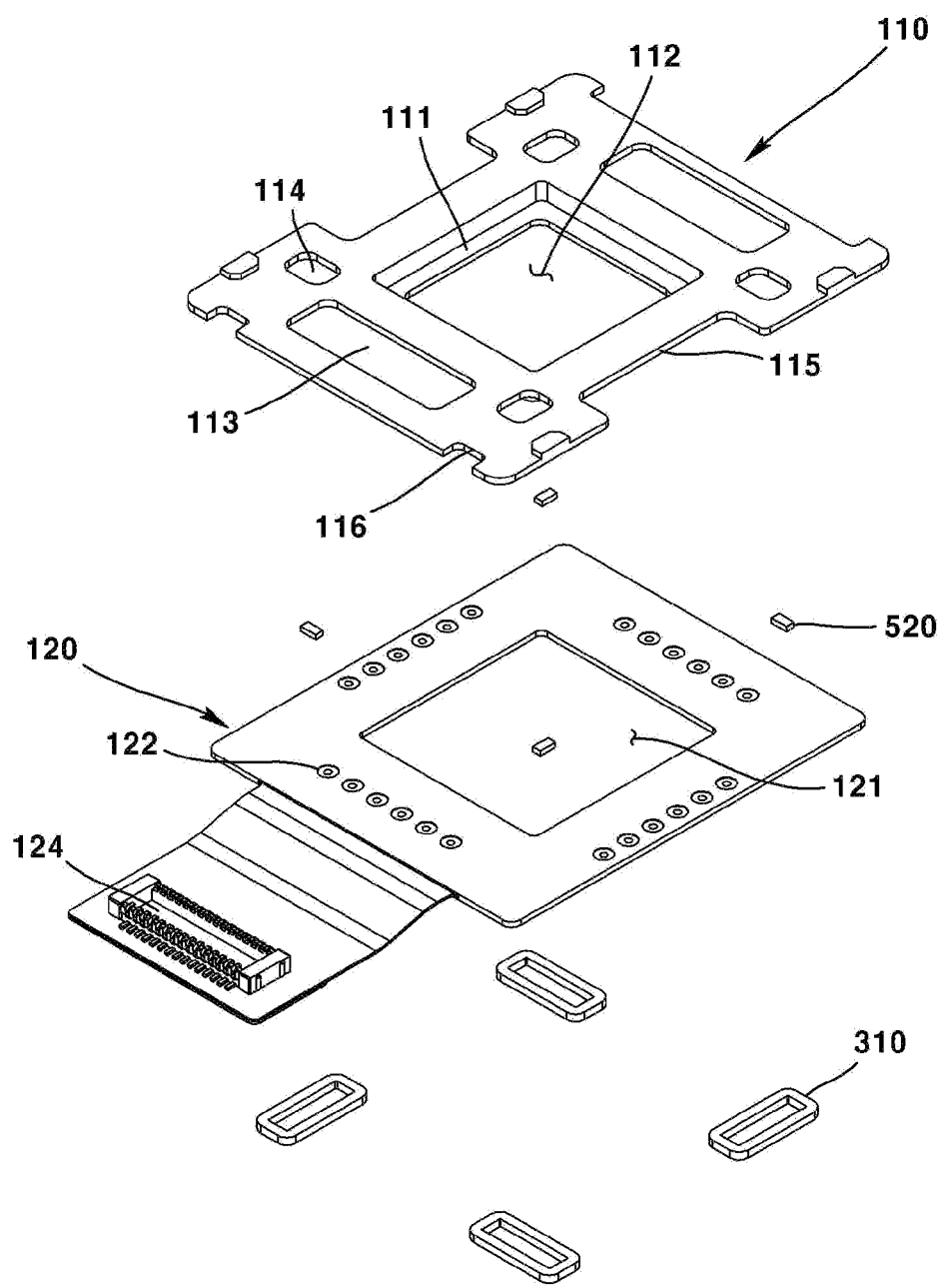
FIG. 5 is an exploded perspective view of a partial configuration of the camera device according to the present embodiment.
Figure 6:
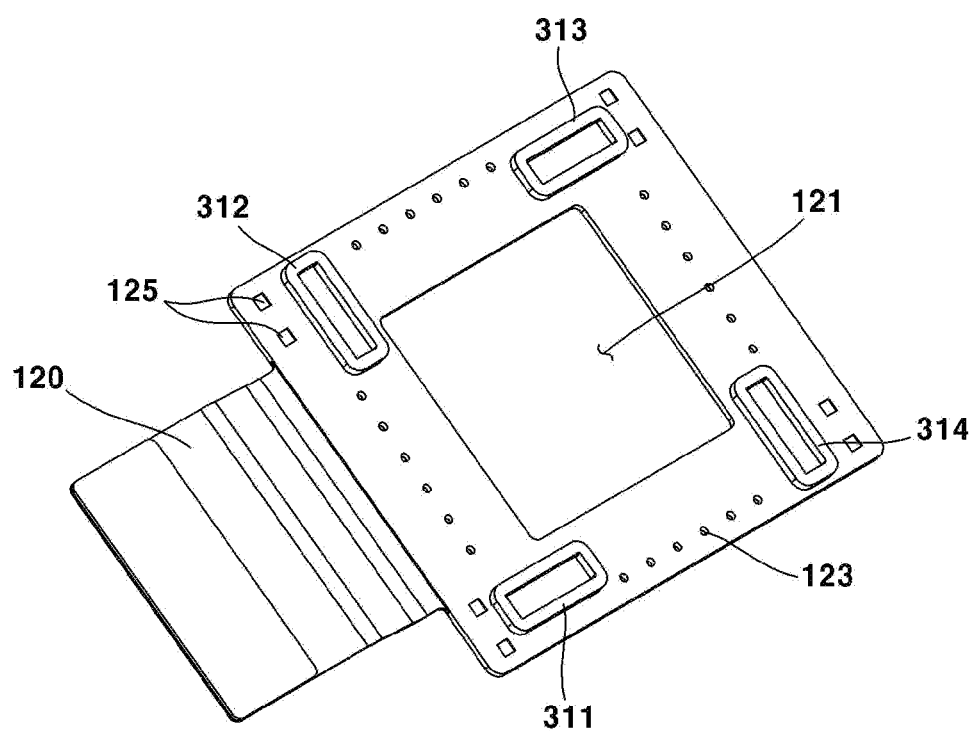
FIG. 6 is a bottom perspective view of a partial configuration of the camera device according to the present embodiment.
Figure 7:
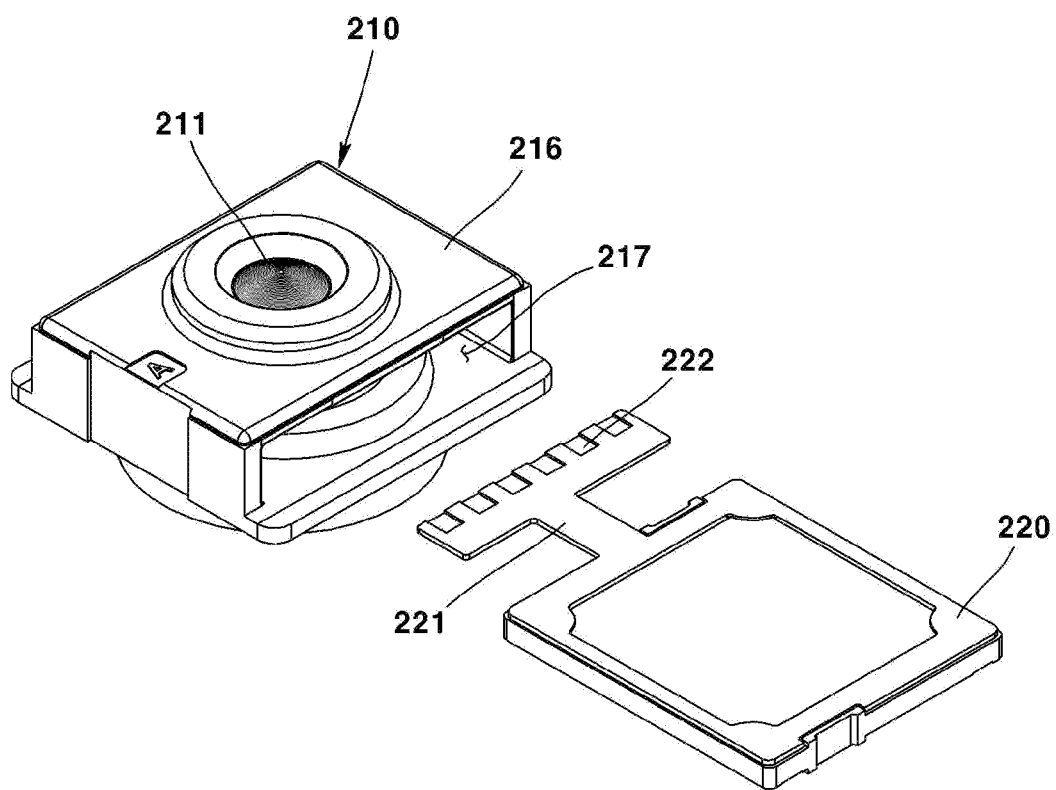
FIG. 7 is a perspective view of a partial configuration of the camera device according to the present embodiment.
Figure 8:
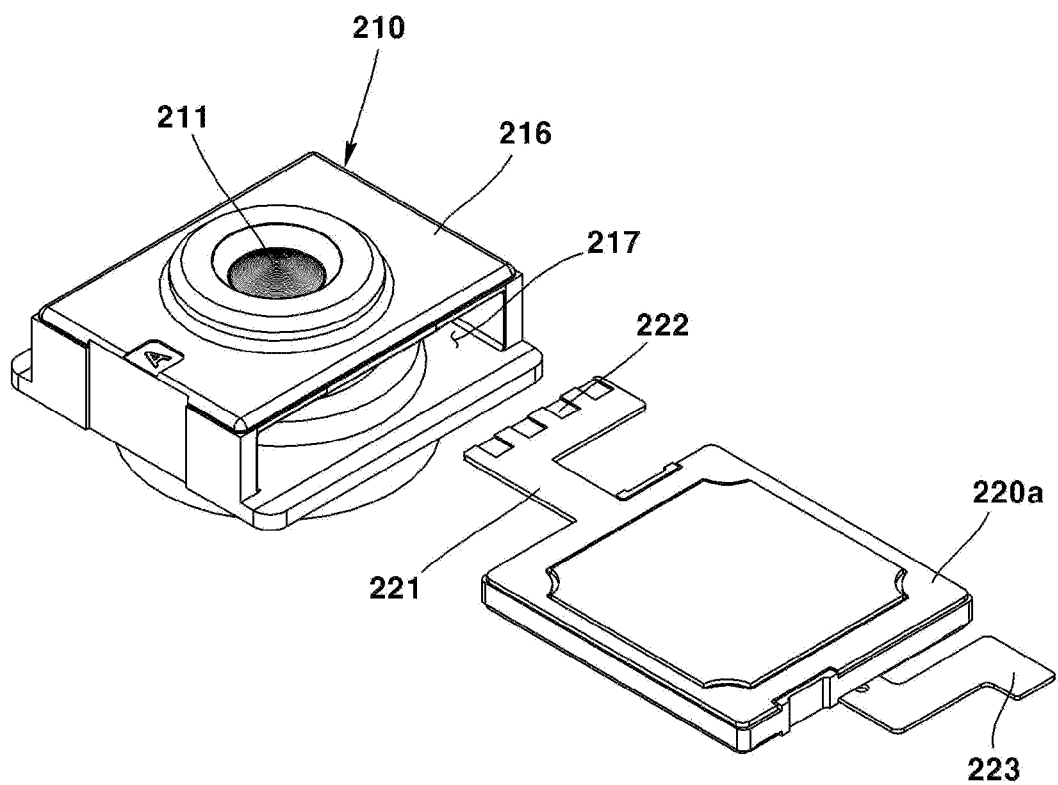
FIG. 8 is a perspective view of a partial configuration of a camera device according to a modified embodiment.
Figure 9A:
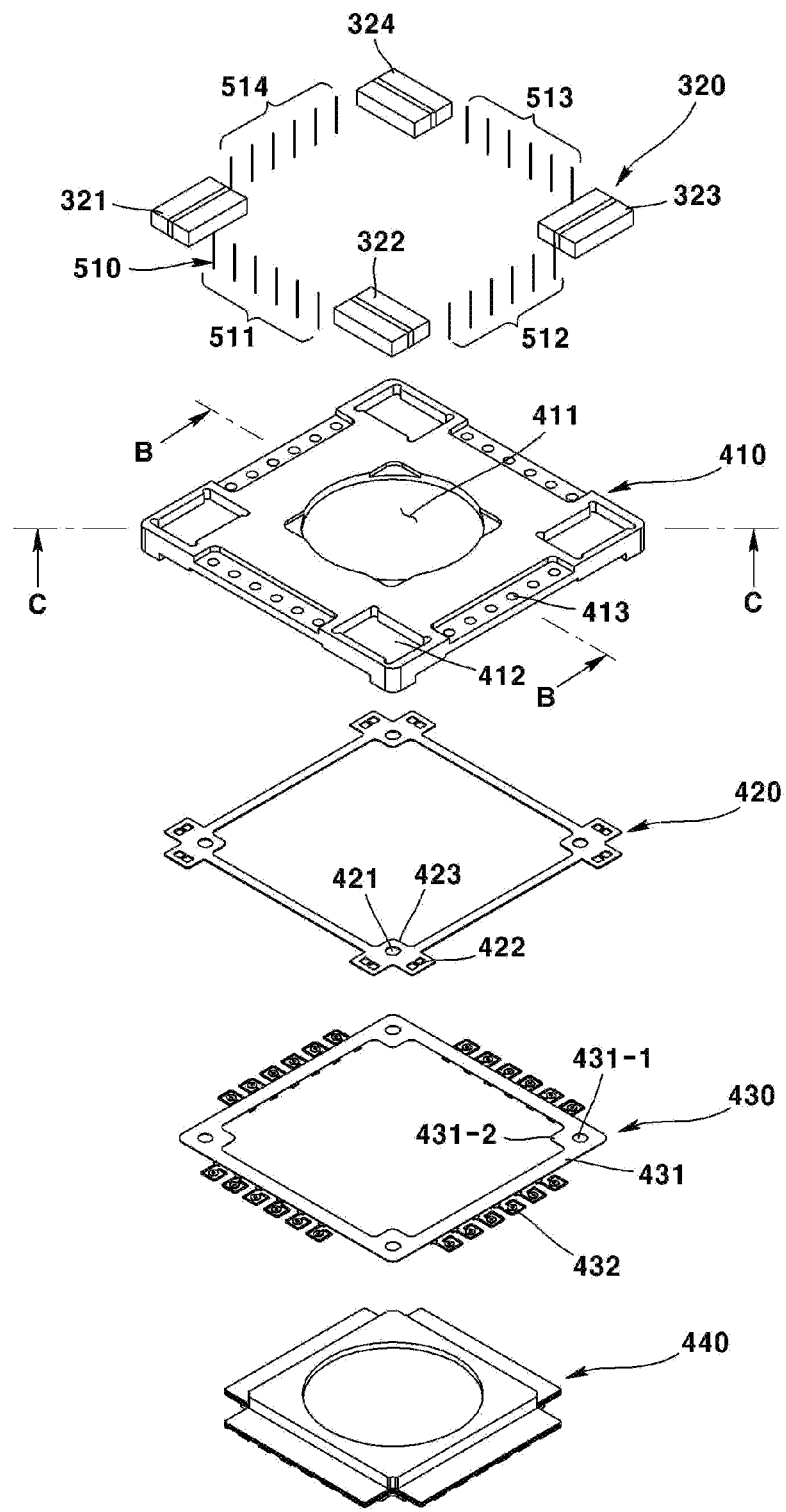
FIG. 9a is an exploded perspective view of a partial configuration of the camera device according to the present embodiment.
Figure 9B:
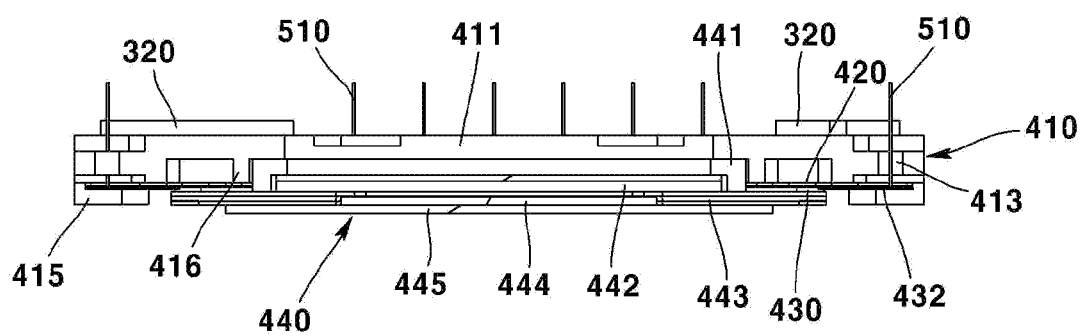
FIG. 9b is a cross-sectional view of a state in which a partial configuration of the camera device of FIG. 9a is combined when viewed from C-C.
Figure 9C:
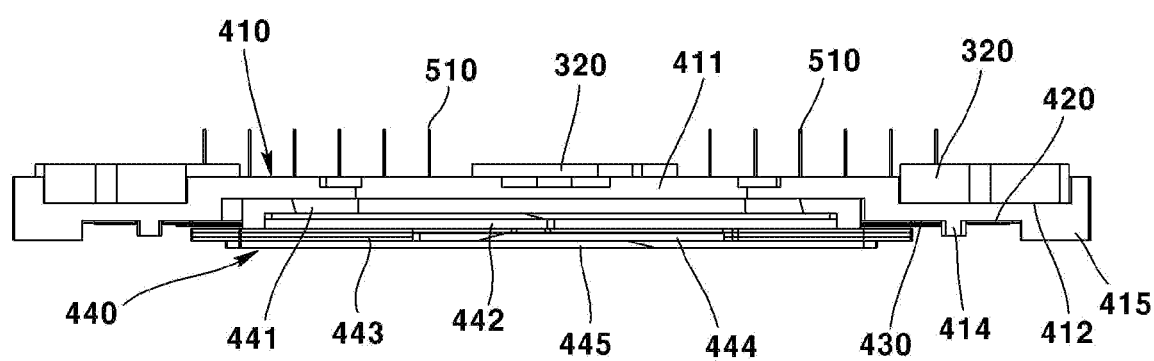
FIG. 9c is a cross-sectional view of a state in which a partial configuration of the camera device of FIG. 9a is combined when viewed from D-D.
Figure 10:
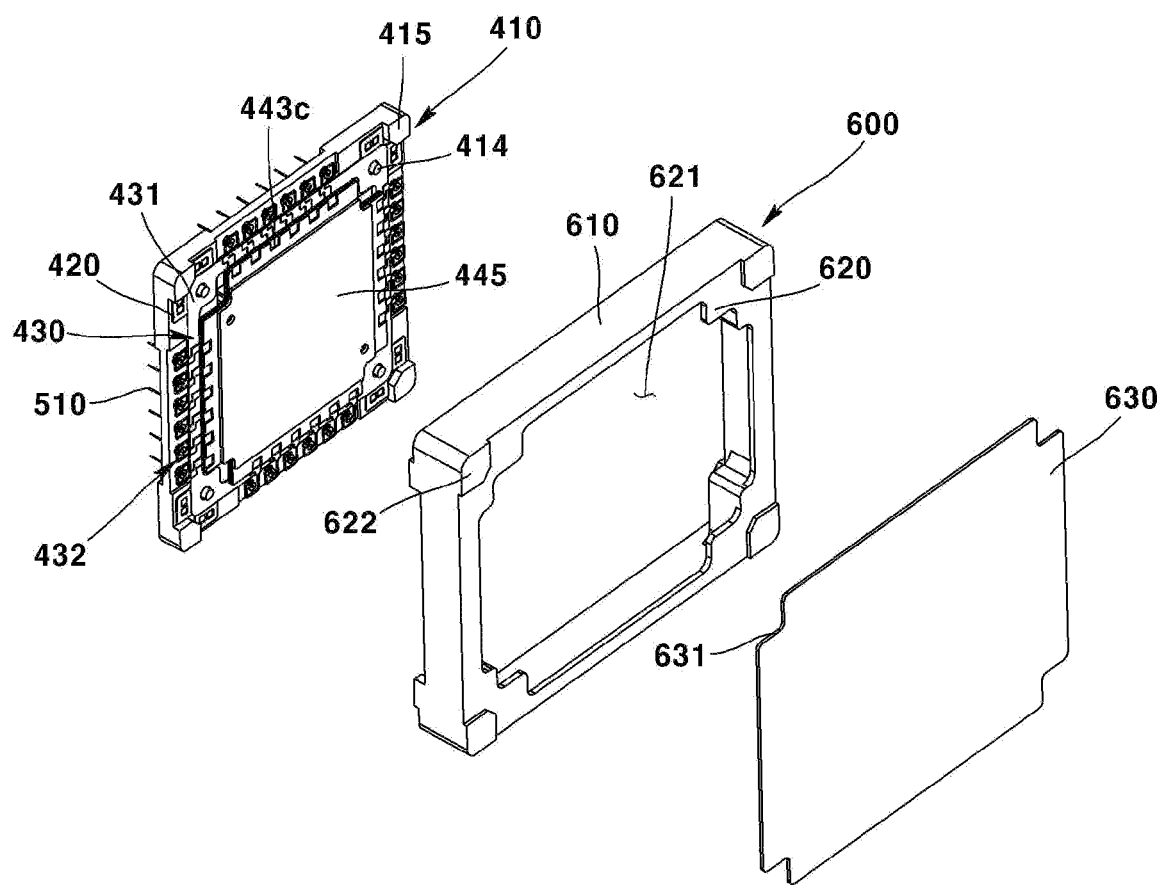
Figure 11:
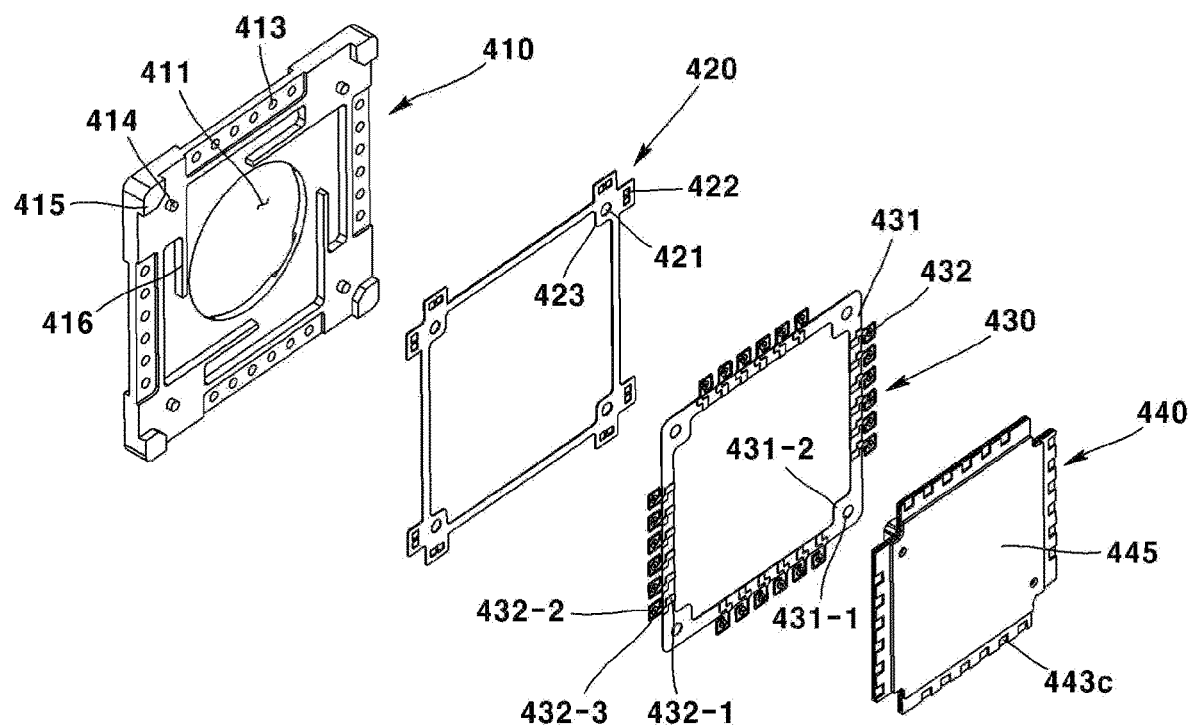
Figure 12:
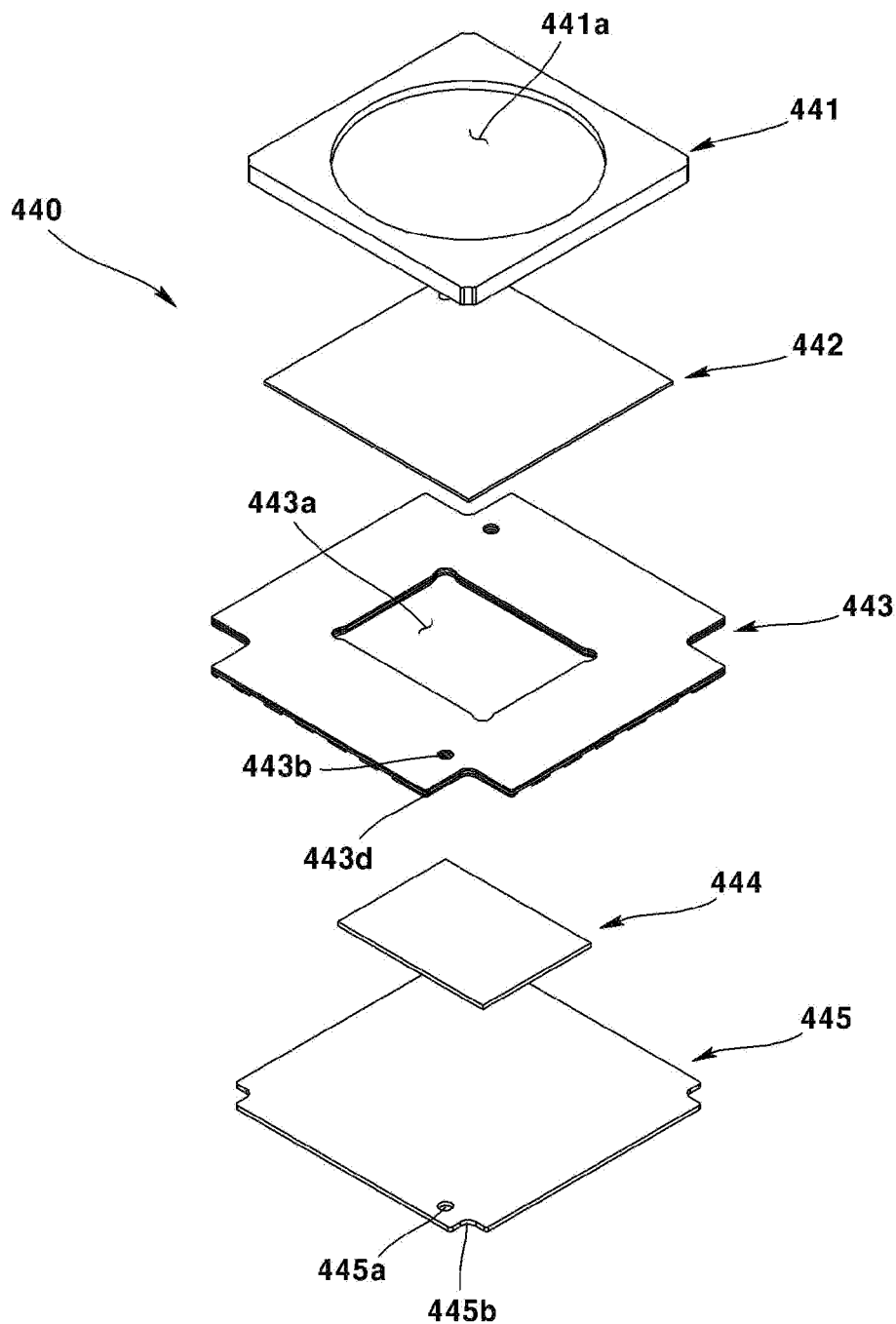
FIG. 12 is an exploded perspective view of an image sensor module of the camera device according to the present embodiment.
Figure 13:
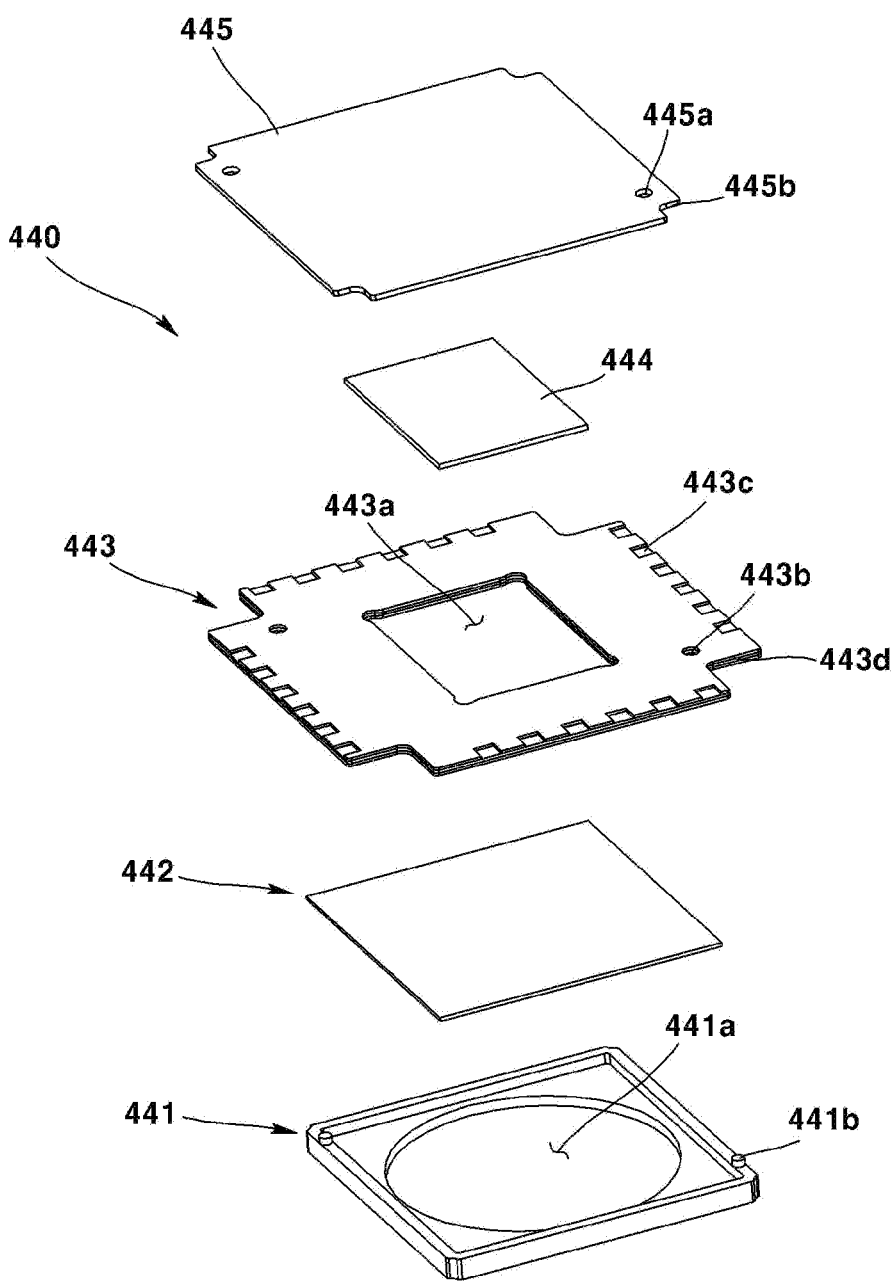
FIG. 13 is an exploded perspective view of an image sensor module of the camera device according to the present embodiment when viewed from a different direction than that of FIG. 12.
Figure 14:
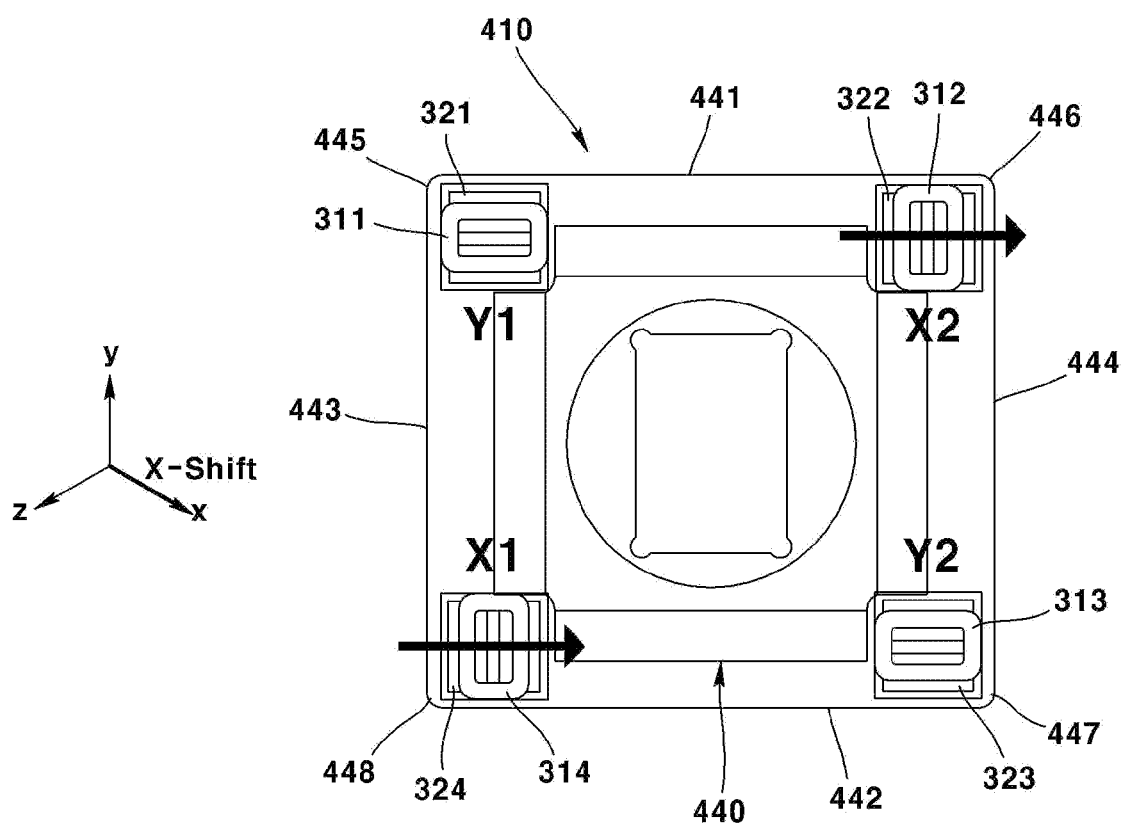
FIG. 14 is a diagram for explaining the x-axis direction shift driving through a partial configuration of a camera device according to the present embodiment.
Figure 15:
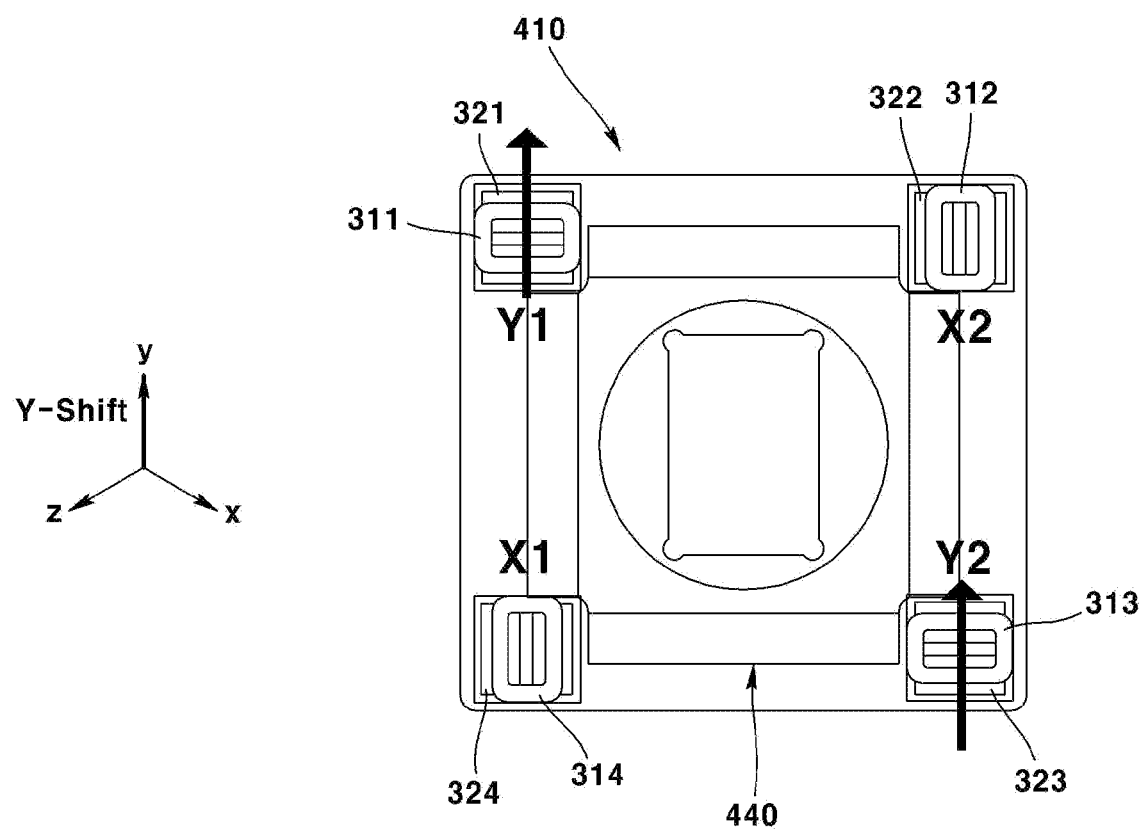
FIG. 15 is a diagram for explaining y-axis direction shift driving through a partial configuration of a camera device according to the present embodiment.
Figure 16:
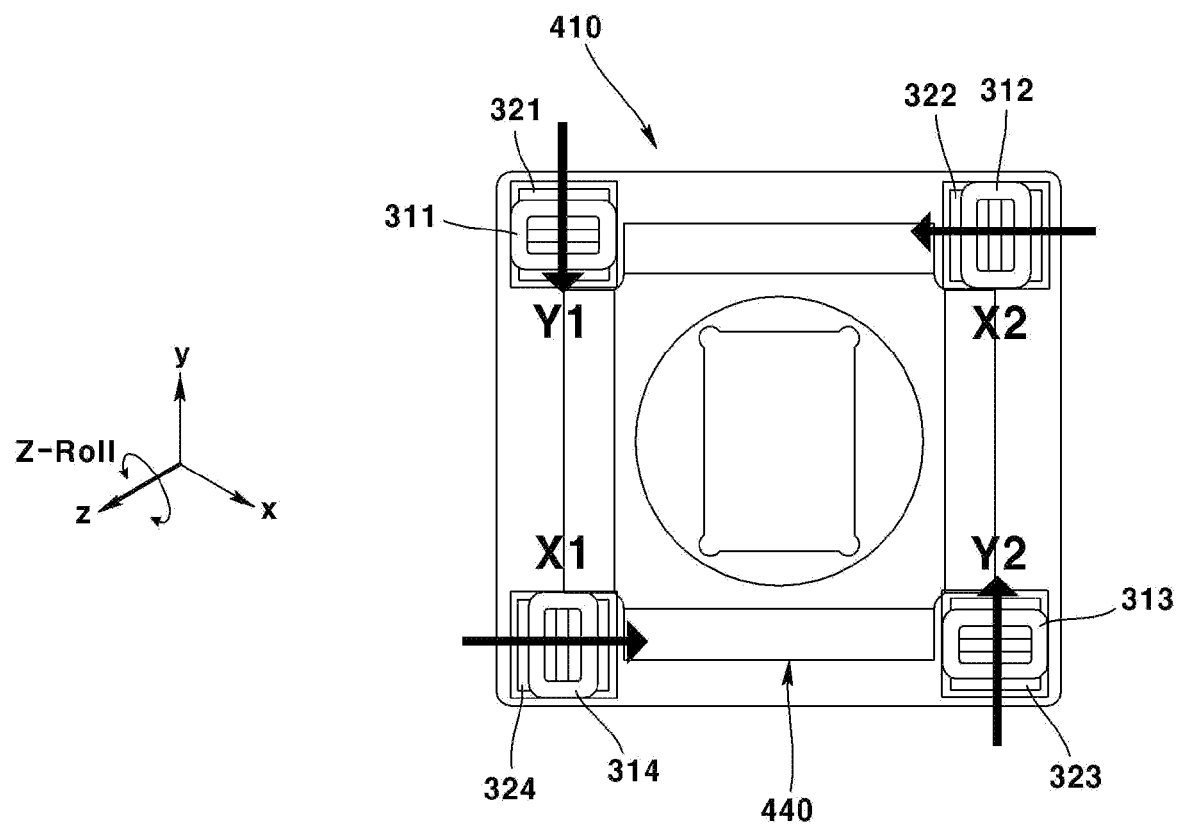
FIG. 16 is a view for explaining z-axis rotational driving through a partial configuration of a camera device according to the present embodiment.
Figure 17A:
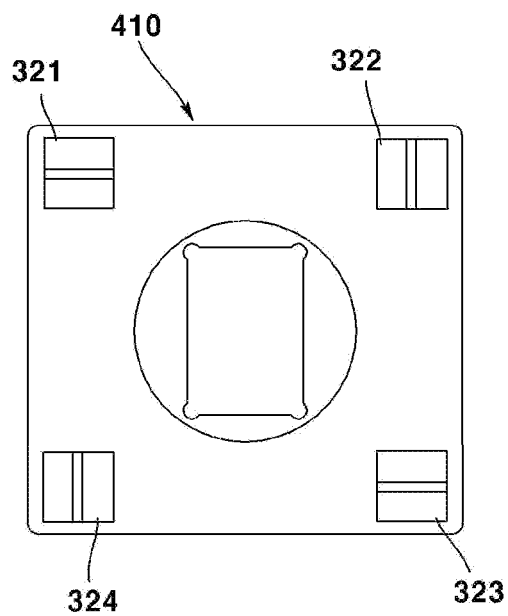
FIG. 17(a) is a view illustrating a magnet disposed on the base together with the x-axis and y-axis.
Figure 17B:
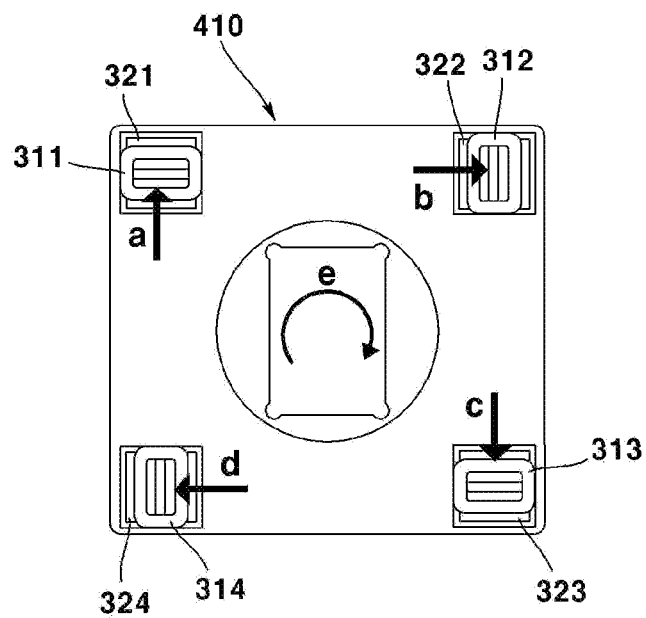
FIG. 17(b) is a view illustrating a base, a magnet and a coil with the z-axis rotational driving.
Figure 18:
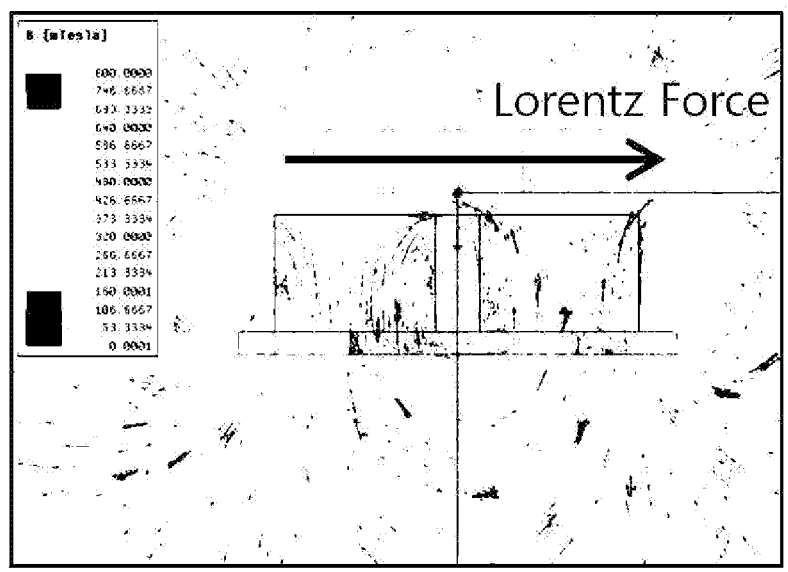
FIG. 18 is a view illustrating a magnetic flow and a Lorentz Force between a magnet and a coil of a camera device according to the present embodiment.

FIG. 1 is a perspective view of a camera device according to the present embodiment, FIG. 2 is a cross-sectional view viewed from A-A of FIG. 1, FIG. 3 is a cross-sectional view viewed from B-B of FIG. 1, FIG. 4 is an exploded perspective view of a partial configuration of the camera device according to the present embodiment, FIG. 5 is an exploded perspective view of a partial configuration of the camera device according to the present embodiment, FIG. 6 is a bottom perspective view of a partial configuration of the camera device according to the present embodiment, FIG. 7 is a perspective view of a partial configuration of the camera device according to the present embodiment, FIG. 8 is a perspective view of a partial configuration of a camera device according to a modified embodiment, FIG. 9a is an exploded perspective view of a partial configuration of the camera device according to the present embodiment, FIG. 9b is a cross-sectional view of a state in which a partial configuration of the camera device of FIG. 9a is combined when viewed from C-C, FIG. 9c is a cross-sectional view of a state in which a partial configuration of the camera device of FIG. 9a is combined when viewed from D-D, FIG. 10 and FIG. 11 are exploded perspective views of a partial configuration of the camera device according to the present embodiment when viewed from a different direction than that of FIG. 9a, FIG. 12 is an exploded perspective view of an image sensor module of the camera device according to the present embodiment, FIG. 13 is an exploded perspective view of an image sensor module of the camera device according to the present embodiment when viewed from a different direction than that of FIG. 12, FIG. 14 is a diagram for explaining the x-axis direction shift driving through a partial configuration of a camera device according to the present embodiment, FIG. 15 is a diagram for explaining y-axis direction shift driving through a partial configuration of a camera device according to the present embodiment, FIG. 16 is a view for explaining z-axis rotational driving through a partial configuration of a camera device according to the present embodiment, FIG. 17(a) is a view illustrating a magnet disposed on the base together with the x-axis and y-axis, and FIG. 17(b) is a view illustrating a base, a magnet and a coil with the z-axis rotational driving, and FIG. 18 is a view illustrating a magnetic flow and a Lorentz Force between a magnet and a coil of a camera device according to the present embodiment.

The camera device 10A may comprise a camera module. The camera device 10A may comprise a lens driving device. The lens driving device may be a voice coil motor (VCM). The lens driving device may be a lens driving motor. The lens driving device may be a lens driving actuator. The lens driving device may comprise an AF module. The lens driving device may comprise an OIS module.

The camera device 10A may comprise an actuator. The actuator may drive the image sensor 444. The actuator may tilt the image sensor 444. The actuator may move the image sensor 444. The actuator may rotate the image sensor 444. The actuator may move the image sensor 444 in a first direction perpendicular to the optical axis, move the image sensor 444 in a second direction perpendicular to the optical axis and the first direction, and rotate the image sensor 444 based on the optical axis. At this time, the first direction may be the x-axis direction, the second direction may be the y-axis direction, and the optical axis may be the z-axis direction. The actuator may comprise a coil 310 and a magnet 320. The actuator may move the image sensor 444 through electromagnetic force.

The camera device 10A may comprise a holder 110. The holder 110 may be disposed on a lower surface of a printed circuit board 50. The holder 110 may comprise a protrusion for fitting into the groove of the printed circuit board 50. The holder 110 may be disposed on an upper surface of the substrate 120. The holder 110 may be disposed between the printed circuit board 50 and the substrate 120. A lens module 210 may be disposed in the holder 110. An optical module may be disposed on the holder 110. The holder 110 may be coupled to the housing 600.

The holder 110 may comprise a step 111. The step 111 may be formed in the circumference of the hole 112 of the holder 110. A lens module 210 may be disposed on the step 111. The step 111 may support a lower surface of a portion of the lens module 210. Through this, it is possible to inhibit the lens module 210 from being displaced downward while seated on the step 111.

The holder 110 may comprise a hole 112. The hole 112 may be a hollow hole. The hole 112 may be an opening. A lens module 210 may be disposed in the hole 112. A portion of the lens module 210 may be extended below the step 111 through the hole 112.

The holder 110 may comprise a first hole 113. The first hole 113 may be formed to avoid a portion of the substrate 120 to be coupled with the wire 510. The first hole 113 may comprise a plurality of holes. The first hole 113 may comprise two holes. The holder 110 may comprise a second hole 114. The second hole 114 may be formed to avoid the sensor 520 being coupled to the substrate 120. The second hole 114 may comprise a plurality of holes. The second hole 114 may comprise four holes.

The holder 110 may comprise a first groove 115. The first groove 115 may be formed to avoid a portion of the substrate 120 to be coupled to the wire 510. The first groove 115 may be formed on a side surface of the holder 110. The first groove 115 may be formed on each of both side surfaces of the holder 110. The first groove 115 may comprise a plurality of grooves. The first groove 115 may comprise two grooves. The holder 110 may comprise a second groove 116. The second groove 116 may be formed in a shape corresponding to the protrusion of the housing 600 so that it can be matched with the protrusion of the housing 600. However, the second groove 116 may not be provided in a shape corresponding to the protrusion of the housing 600. The second groove 116 may be formed on a side surface of the holder 110. The second groove 116 may be formed on each of both sides of the holder 110. The second groove 116 may comprise a plurality of grooves. The second groove 116 may comprise three grooves. The second groove 116 is formed as two grooves on one side surface of the holder 110 and may be formed as a single groove connected with the two grooves on the other side surface of the holder 110.

The camera device 10A may comprise a substrate 120. The substrate 120 may be disposed in the holder 110. The substrate 120 may be disposed on a lower surface of the holder 110. The upper surface of the substrate 120 may be in contact with a lower surface of the holder 110. The substrate 120 may be disposed below the printed circuit board 50. The substrate 120 may be coupled to the wire 510. The substrate 120 may be a rigid flexible PCB (RFPCB). The substrate 120 may comprise first to fourth corners.

The substrate 120 may comprise a first hole 121. The first hole 121 may be formed in the central portion of the substrate 120. The first hole 121 may be a hollow hole. The first hole 121 may be an opening. A lens module 210 may be disposed in the first hole 121. The first hole 121 of the substrate 120 may be formed to have a greater width than the hole 112 of the holder 110.

The substrate 120 may comprise a coupling portion 122. The substrate 120 may be coupled to the wire 510 at the coupling portion 122. The substrate 120 and the wire 510 may be coupled through soldering. The coupling portion 122 may be a portion in which a solder resistor is opened to be electrically connected to the wire 510. A second hole 123 may be formed in the coupling portion 122. The substrate 120 may comprise a second hole 123. The second hole 123 may be a wire through hole through which the wire 510 passes.

The substrate 120 may comprise a connector 124. The connector 124 may be electrically connected to the printed circuit board 50. A connector corresponding to the connector 124 of the substrate 120 may be disposed on the printed circuit board 50. The connector 124 may comprise a port for electrically connecting to an external device.

The substrate 120 may comprise a terminal 125. The terminal 125 may be formed on a lower surface of the substrate 120. The terminal 125 may be electrically connected to the coil 310. The terminal 125 may be coupled to a pair of lead wires of the coil 310 by soldering or Ag epoxy. The terminal 125 may comprise a plurality of terminals. The terminal 125 may comprise a total of eight terminals, two for each of four coils.

The camera device 10A may comprise a lens module 210. The lens module 210 may be disposed in the holder 110. The lens may be disposed at a position corresponding to the image sensor 444. The lens module 210 may comprise at least one lens. The lens module 210 may comprise a plurality of lenses. The lens module 210 may comprise five lenses. The lens module 210 may comprise first to fifth lenses 211, 212, 213, 214, and 215. The lens module 210 may comprise a barrel 216. A plurality of lenses may be disposed inside the barrel 216. The lens module 210 may comprise a hole 217. An optical module may be disposed in the hole 217 of the lens module 210. The hole 217 of the lens module 210 may be formed to penetrate through the lens module 210 in the horizontal direction between the plurality of lenses. Through this, the optical axis of the plurality of lenses and the optical axis of the optical module may be aligned. The hole 217 of the lens module 210 may be formed between the second lens 212 and the third lens 213.

The camera device 10A may comprise an optical module. The optical module may perform hand-shake correction (OIS) function. The optical module may perform an auto focus (AF) function. The optical module may be disposed in alignment with the plurality of lenses and the image sensor 444. The optical module may be disposed between the plurality of lenses. The optical module may be disposed between the second lens 212 and the third lens 213.

The camera module may comprise a variable lens. The variable lens may be a variable focus lens. The variable lens may be a lens whose focus is controlled. The focus may be adjusted by moving the lens and/or changing the shape of the lens. The variable lens may comprise at least one among a liquid lens 687, a polymer lens, a liquid crystal lens, a voice coil motor (VCM) actuator, a shape memory alloy (SMA) actuator, and a micro electro mechanical systems (MEMS) actuator. The liquid lens 687 may comprise at least one of a liquid lens 687 containing one type of liquid and a liquid lens 687 containing two types of liquid. The liquid lens 687 comprising one type of liquid may change the focus by adjusting a membrane disposed at a position corresponding to the liquid. For example, the focus can be changed by pressing the membrane by the electromagnetic force of the magnet and coil. The liquid lens 687 comprising two types of liquids may comprise a conductive liquid and a non-conductive liquid. In this case, the focus may be changed by adjusting the interface formed between the conductive liquid and the non-conductive liquid using a voltage applied to the liquid lens 687. The polymer lens can change the focus by controlling a polymer material through a driving unit such as a piezo. The liquid crystal lens can change the focus by controlling the liquid crystal by electromagnetic force. The VCM actuator can change focus by moving a solid lens or a lens assembly comprising a solid lens through electromagnetic force between a magnet and a coil. The SMA actuator may change a focus by moving a solid lens or a lens assembly comprising a solid lens using a shape memory alloy. The MEMS actuator 220 may change the focus by moving a solid lens or a lens assembly comprising the solid lens through electrostatic force generated when voltage is applied. The optical module may comprise one or more of the liquid lens 220a and the MEMS actuator 220.

The barrel 216 may comprise a hole 217 penetrating through the barrel 216 in a horizontal direction. At this time, the variable lens may be disposed by being inserted into the hole 217 formed in the barrel 216. Meanwhile, the variable lens may be electrically connected to the printed circuit board 50. The variable lens may be electrically connected to the printed circuit board 50 through the substrate 221.

As illustrated in FIG. 7, the camera device 10A may comprise a MEMS actuator 220. The MEMS actuator 220 may perform an autofocus function and/or an hand-shake correction function by moving a moving lens using a silicon wafer.

The MEMS actuator 220 may be connected to the substrate 221. The substrate 221 may comprise a terminal 222. The terminal 222 may comprise a plurality of terminals. Terminal 222 may comprise six terminals. The terminal 222 of the substrate 221 may be connected to the terminal 50a of the printed circuit board 50.

As a modified embodiment, as illustrated in FIG. 8, the camera device 10A may comprise a liquid lens 220a. The liquid lens 220a may be disposed on the lens module 210. The liquid lens 220a may be connected to the first substrate 221 and the second substrate 223. Each of the first substrate 221 and the second substrate 223 may comprise a terminal 222. Four terminals 222 may be provided on a side of the first substrate 221 and one terminal 222 may be provided on a side of the second substrate 223. The four terminals 222 of the first substrate 221 are electrodes electrically connected to the four individual electrodes of the liquid lens 220a, and one terminal 222 of the second substrate 223 may be an electrode electrically connected to one common electrode of the liquid lens 220a.

The liquid lens 220a whose focal length is adjusted in response to the driving voltage may receive an operating voltage through an upper terminal. The upper terminal may have the same angular distance and may comprise four individual terminals disposed in different directions. When an operating voltage is applied through the upper terminal, the interface between the conductive liquid and the non-conductive liquid formed in the lens region may be deformed. The lower terminal may be a common terminal. The upper terminal may be an upper electrode. The lower terminal may be a lower electrode. The liquid lens 220a may be spaced apart from the solid lens. In this embodiment, epoxy may be applied through the space between the liquid lens 220a and the solid lens, and active alignment of the liquid lens 220a may be performed. Active alignment of the liquid lens 220a and the solid lens can be performed by applying a current to the liquid lens 220a in a state in which the epoxy is applied, aligning the optical axis with the solid lens, pre-curing the epoxy, and then main-curing the epoxy.

The liquid lens 220a may be described as a plurality of capacitors having one side applied with an operating voltage from an upper terminal and the other side connected to a lower terminal. Here, the plurality of capacitors comprised in the equivalent circuit may have a small capacitance of about 200 pF. In the present embodiment, the upper terminal of the liquid lens 220a is an individual terminal and the lower terminal may be a common terminal. Alternatively, the upper terminal of the liquid lens 220a may be a common terminal and the lower terminal may be an individual terminal. In the liquid lens 220a, the interface formed between the conductive liquid and the non-conductive liquid may be deformed by the current applied to the upper terminal and the lower terminal. Through this, any one or more of the AF function and the OIS function can be performed.

The camera device 10A may comprise a coil 310. The coil 310 may be disposed on the substrate 120. The coil 310 may be electrically connected to the substrate 120. The coil 310 may be disposed to face the magnet 320. When a current is applied to the coil 310, an electric field may be formed around the coil 310. When a current is applied to the coil 310, any one of the coil 310 and the magnet 320 may move relative to the other through electromagnetic interaction between the coil 310 and the magnet 320.

The coil 310 may comprise four coils. Currents may be independently applied to at least three coils among the four coils. In the first embodiment, the coil 310 may be controlled by three channels. Alternatively, in the second embodiment, the coil 310 may be controlled by four channels. The four coils 310 may be electrically isolated from each other. Any one of a forward current and a reverse current may be selectively applied to each of the four coils 310. In the present embodiment, only three of the four coils are electrically isolated, and one coil may be electrically connected to the other coil. Alternatively, all four coils may be electrically isolated. When only 3 out of 4 coils are electrically isolated, 3 pairs of 6 lead wires come out from the coil 310, and when all four coils are electrically isolated, a total of eight lead wires in four pairs may come out from the coil 310.

When controlling 4 coils with 3 channels as in the first embodiment of the present embodiment, it should be driven with one pair of the coil 310 and the magnet 320 in rotational driving about z-axis, but when controlling 4 coils with 4 channels as in the second embodiment, it can be driven with two pairs of the coil 310 and the magnet 320 in rotational driving about z-axis.

The coil 310 may comprise first to fourth coils 311, 312, 313, and 314. The first coil 311 may be disposed to face the first magnet 321. The second coil 312 may be disposed to face the second magnet 322. The third coil 313 may be disposed to face the third magnet 323. The fourth coil 314 may be disposed to face the fourth magnet 324. The first coil 311 may be disposed at a first corner of the substrate 120. The second coil 312 may be disposed at the second corner of the substrate 120. The third coil 313 may be disposed at the third corner of the substrate 120. The fourth coil 314 may be disposed at the fourth corner of the substrate 120. The first coil 311 and the third coil 313 are disposed on a first diagonal direction of the substrate 120, and the second coil 312 and the fourth coil 314 may be disposed on a second diagonal direction of the substrate 120.

In the present embodiment, the first coil 311 and the third coil 313 are disposed to be elongated in the first direction, and the second coil 312 and the fourth coil 314 may be disposed to be elongated in the second direction. At this time, the first direction and the second direction may be perpendicular. A long side of the first coil 311 and a long side of the third coil 313 may be disposed parallel to each other. The long side of the second coil 312 and the long side of the fourth coil 314 may be disposed parallel to each other. The long side of the first coil 311 and the long side of the second coil 312 may be disposed not to be parallel to each other. At this time, the long side of the first coil 311 and the long side of the second coil 312 may be disposed such that virtual extension lines thereof are perpendicular to each other. The arrangement direction of the first coil 311 and the arrangement direction of the second coil 312 may be orthogonal to each other. The long side of the coil may mean a long side at the outer circumference of the coil. The short side of the coil may mean a short side at the outer circumference of the coil. The outer circumference of the coil may comprise two long sides and two short sides. A corner portion where the long side and the short side meet may be formed to be round.

The first coil 311 may be disposed in a direction different from that of the second coil 312. The first coil 311 may be disposed in the same direction as the third coil 313. The second coil 312 may be disposed in the same direction as the fourth coil 314.

In the present embodiment, current may be independently applied to at least three among the first to fourth coils 311, 312, 313, and 314. The first to fourth coils 311, 312, 313, and 314 may be electrically isolated from one another.

The camera device 10A may comprise a magnet 320. The magnet 320 may be disposed on the base 410. The magnet 320 may be disposed at a corner of the base 410. The magnets 320 may be respectively disposed at four corners of the base 410. The magnet 320 may face the coil 310. The magnet 320 may electromagnetically interact with the coil 310. The magnet 320 may move through electromagnetic interaction with the coil 310. That is, when a current is applied to the coil 310, the magnet 320 may move. The magnet 320 may be a flat magnet having a flat plate shape. In the present embodiment, the coil 310 is fixed and the magnet 320 may move. However, as a modified embodiment, the coil 310 and the magnet 320 may be disposed in reverse.

The magnet 320 may comprise a plurality of magnets. The magnet 320 may comprise four magnets. The magnet 320 may comprise first to fourth magnets 321, 322, 323, and 324. The first magnet 321 may face the first coil 311. The first magnet 321 may be disposed at a first corner 410e of the base 410. The second magnet 322 may face the second coil 312. The second magnet 322 may be disposed at a second corner 410f of the base 410. The third magnet 323 may face the third coil 313. The third magnet 323 may be disposed at a third corner 410g of the base 410. The fourth magnet 324 may face the fourth coil 314. The fourth magnet 324 may be disposed at a fourth corner 410h of the base 410. Each of the plurality of magnets may be disposed perpendicularly to an adjacent magnet and parallel to the magnets disposed in a diagonal direction.

A polarity of a surface of the first magnet 321 facing the coil 310 may be different from a portion close to a first side surface 410a and a portion close to a second side surface 410b. A polarity of a surface of the second magnet 322 facing the coil 310 may be different from a portion close to a third side surface 410c and a portion close to a fourth side portion 410d. A polarity of a surface of the third magnet 323 facing the coil 310 may be different from a portion close to the first side surface 410a and a portion close to the second side surface 410b. A polarity of a surface of the fourth magnet 324 facing the coil 310 may be different from a portion close to the third side surface 410c and a portion close to the fourth side surface 410d. That is, the first magnet 321 and the third magnet 323 may be disposed in the same direction, and the second magnet 322 and the fourth magnet 324 may be disposed in the same direction. The first magnet 321 may be vertically disposed with the second magnet 322. Polarities of the first to fourth magnets 321, 322, 323, and 324 may be the same as inner side portions. The polarities of the first to fourth magnets 321, 322, 323, and 324 may be the same as the outer side portions. The polarity of each of the first to fourth magnets 321, 322, 323, and 324 may be formed as an N pole at an inner side portion. The polarity of each of the first to fourth magnets 321, 322, 323, and 324 may be formed as an S pole at an outer side portion thereof. However, in a modified embodiment, the polarity of each of the first to fourth magnets 321, 322, 323, and 324 may have an inner side portion formed as an S pole and an outer side portion formed as an N pole.

As illustrated in FIG. 14, in the present embodiment, when a current in the same direction is applied to the second coil 312 and the fourth coil 314, the image sensor 444 coupled to the base 410 may be moved (shifted) in the x-axis direction through electromagnetic interaction with the second magnet 322 and the fourth magnet 324, respectively. That is, the second coil 312 and the second magnet 322 and the fourth coil 314 and the fourth magnet 324 may be used for shift driving of the image sensor 444 in the x-axis direction. At this time, the second coil 312 and the second magnet 322 is a first x-axis shift driving unit X2, and the fourth coil 314 and the fourth magnet 324 may be a second x-axis shift driving unit X1.

As illustrated in FIG. 15, in the present embodiment, when currents in the same direction are applied to the first coil 311 and the third coil 313, the image sensor 444 coupled to the base 410 may be moved (shifted) in the y-axis direction through electromagnetic interaction between the first magnet 321 and the third magnet 323, respectively. That is, the first coil 311 and the first magnet 321, and the third coil 313 and the third magnet 323 may be used for shift driving of the image sensor 444 in the y-axis direction. In this case, the first coil 311 and the first magnet 321 may be a first y-axis shift driving unit Y1, and the third coil 313 and the third magnet 323 may be a second y-axis shift driving unit Y2.

As illustrated in FIG. 16, the present embodiment, when currents of opposite directions are applied to the first coil 311 and the third coil 313 and currents of opposite directions are applied to the second coil 312 and the fourth coil 314, and at this time, if the direction in which the magnet 320 is rotated by the current applied to the first coil 311 and the current applied to the second coil 312 is the same, the image sensor 444 coupled to the base 410 may be rotating (rolling) about the z-axis. The embodiment illustrated in FIG. 16 illustrates a case in which the coil 310 is controlled by 4 channels, and if the coil 310 is controlled by 3 channels the image sensor 444 can be rolled through the first coil 311 and the third coil 313 or the second coil 312 and the fourth coil 314. This is because if there is a coil bundled with one channel among the first coil 311 and the third coil 313, and the second coil 312 and the fourth coil 314, current cannot be applied in the opposite direction.

As illustrated in FIG. 17(b), in the present embodiment, a forward current is applied to the first coil 311, and through this, the first coil 311 pushes the first magnet 321 in a first direction (refer to a in FIG. 17(b)), a forward current is applied to the second coil 312 and the second coil 312 pushes the second magnet 322 in a second direction (refer to b in FIG. 17(b)), a reverse current is applied to the third coil 313, and through this, the third coil 313 pushes the third magnet 323 in a third direction (refer to c in FIG. 17(b)), a reverse current is applied to the fourth coil 314, and through this, the fourth coil 314 pushes the fourth magnet 324 in a fourth direction (refer to d in FIG. 17(b)), and as a results, the image sensor 444 coupled to the base 410 may be rotated about the z-axis (refer to e of FIG. 17(b)). At this time, the first to fourth directions may correspond to a clockwise direction with respect to the center of the base 410.

In the present embodiment, the magnetic flow of the magnet 320 is same as illustrated in FIG. 18. Referring to FIG. 18, it can be confirmed that there is a magnetic force line passing perpendicular to the coil 310, and in this state, when a current is applied to the coil 310, the coil 310 can be moved against the magnet 320 according to the Lorentz Force.

The camera device 10A may comprise a base 410. The base 410 may be disposed to be spaced apart from the holder 110. The base 410 is a part that moves together with the magnet 320 when a current is applied to the coil 310 and may be a mover. In addition, the base 410 may be a sensor PCB holder. The base 410 may be shifted in the x-axis direction. The base 410 may be shifted in the y-axis direction. The base 410 may be rotated about the z-axis (optical axis).

The base 410 may comprise a first hole 411. The first hole 411 may be a hollow hole. The first hole 411 may be an opening.

The base 410 may comprise a groove 412. The groove 412 may be formed on an upper surface of the base 410. The groove 412 may accommodate at least a portion of the magnet 320. The magnet 320 may be disposed in the groove 412 of the base 410. The groove 412 may be formed in a shape corresponding to the magnet 320. However, the depth of the groove 412 may be smaller than the thickness in the corresponding direction of the magnet 320. In this case, a portion of the magnet 320 disposed in the groove 412 may be protruded from the base 410. The groove 412 may comprise a plurality of grooves. The number of grooves 412 may be formed to correspond to the number of magnets 320. The groove 412 may comprise four grooves.

The base 410 may comprise a second hole 413. The second hole 413 may be formed penetrating through the base 410 in a direction parallel to the optical axis. A wire 510 may be disposed in the second hole 413. The wire 510 may pass through the second hole 413. The second hole 413 may comprise a plurality of holes. The second hole 413 may be formed in a number corresponding to the number of wires 510. The second hole 413 may comprise 24 holes.

The base 410 may comprise a first protrusion 414. The first protrusion 414 may be formed on a lower surface of the base 410. The first protrusion 414 may be inserted into a first hole 421 of a reinforcing member 420 and a hole 431-1 of a terminal portion 430. The first protrusion 414 may be formed in a shape corresponding to the first hole 421 of the reinforcing member 420 and the hole 431-1 of the terminal portion 430. The first protrusion 414 may comprise a plurality of protrusions. The first protrusion 414 may comprise four protrusions. The four protrusions may be respectively formed at the four corners of the base 410.

The base 410 may comprise a second protrusion 415. The second protrusion 415 may be formed on a lower surface of the base 410. The second protrusion 415 may be spaced apart from the first protrusion 414. The second protrusion 415 may be extended from a side surface of the base 410. A lower surface of the second protrusion 415 may be disposed lower than a lower surface of the reinforcing plate 445 of the image sensor module 440. The second protrusion 415 may comprise a plurality of protrusions. The second protrusion 415 may comprise four protrusions. The four protrusions may be respectively formed at the four corners of the base 410.

The base 410 may comprise a guide protrusion 416. The guide protrusion 416 may be formed on a lower surface of the base 410. The guide protrusion 416 may guide an assembly position of the image sensor module 440. The guide protrusion 416 may be in contact with the cover 441 of the image sensor module 440. The guide protrusion 416 may be in contact with four side surfaces of the cover 441 of the image sensor module 440.

The base 410 may comprise a plurality of side surfaces. The base 410 may comprise four side surfaces. The base 410 may comprise first to fourth side surfaces 410a, 410b, 410c, and 410d. The base 410 may comprise a first side surface 410a and a second side surface 410b disposed opposite to each other, and a third side surface 410c and a fourth side surface 410d disposed opposite to each other between the first side surface 410a and a second side surface 410b.

The base 410 may comprise corners formed between a plurality of side surfaces. The base 410 may comprise a plurality of corners. The base 410 may comprise four corners. The base 410 may comprise first to fourth corners 410e, 410f, 410g, and 410h. The first corner 410e of the base 410 may be disposed between the first side surface 410a and the third side surface 410c. The second corner 410f of the base 410 may be disposed between the third side surface 410c and the second side surface 410b. The third corner 410g of the base 410 may be disposed between the second side surface 410b and the fourth side surface 410d. The fourth corner 410h of the base 410 may be disposed between the fourth side surface 410d and the first side surface 410a.

The camera device 10A may comprise a reinforcing member 420. The reinforcing member 420 may be formed of a SUS. The reinforcing member 420 may reinforce the terminal portion 430. The reinforcing member 420 may be coupled to the terminal portion 430. The reinforcing member 420 may be bonded to the terminal portion 430 by an adhesive. The reinforcing member 420 may be disposed on a lower surface of the base 410.

The reinforcing member 420 may comprise a first hole 421. The first hole 421 may be coupled to the first protrusion 414 of the base 410. The reinforcing member 420 may comprise a second hole 422. An adhesive may be applied to the second hole 422. The second hole 422 may be formed in a protruding portion of the reinforcing member 420. The second hole 422 may comprise a plurality of holes. The second hole 422 may be formed in a total of 16, two in each of the four corners of the reinforcing member 420, two in eight protruding portions in total.

The reinforcing member 420 may comprise a protrusion 423. The protrusion 423 may be formed to be protruded inward from a corner of the reinforcing member 420. A space in which the first hole 421 is to be formed may be secured through the protrusion 423. A first hole 421 may be formed in the protrusion 423.

The camera device 10A may comprise a terminal portion 430. The terminal portion 430 may be disposed on a lower surface of the base 410. The terminal portion 430 may be coupled to the reinforcing member 420. The terminal portion 430 may be coupled to the image sensor module 440.

The terminal portion 430 may comprise a substrate 431. The substrate 431 may be coupled to a lower surface of the base 410. The substrate 431 may be coupled to the reinforcing member 420. The substrate 431 may be coupled to the image sensor module 440. The substrate 431 may comprise a hole 431-1. The hole 431-1 may be coupled to the first protrusion 414 of the base 410. The substrate 431 may comprise a protrusion 431-2. The protrusion 431-2 may be formed to be protruded inward from a corner of the substrate 431. A space in which the hole 431-1 is to be formed may be secured through the protrusion 431-2. A hole 431-1 may be formed in the protrusion 431-2.

The terminal portion 430 may comprise a terminal 432. The terminal 432 may be electrically connected to a terminal of the image sensor 444. The terminal 432 may comprise a plurality of terminals. The terminal 432 may comprise a total of 24 terminals.

The terminal 432 comprises a first coupling portion 432-1 disposed on the board 431, a second coupling portion 432-2 coupled to the wire 510, and a connection portion 432-3 connecting a first coupling portion 432-1 and the second coupling portion 432-2 to each other. A hole through which the wire 510 passes may be formed in the second coupling portion 432-2. The second coupling portion 432-2 may be coupled to the wire 510 by soldering. The connection portion 432-3 may comprise a bent portion. The connection portion 432-3 may be bent a plurality of times. The connection portion 432-3 may have elasticity. The terminal 432 may have elasticity.

The camera device 10A may comprise an image sensor module 440. The image sensor module 440 may be coupled to the base 410. The image sensor module 440 may be fixed to the base 410. The image sensor module 440 may move integrally with the base 410. The image sensor module 440 may comprise a cover 441, a filter 442, a substrate 443, an image sensor 444, and a reinforcing plate 445. However, any one or more among the cover 441, the filter 442, the substrate 443, the image sensor 444, and the reinforcing plate 445 of the image sensor module 440 may be omitted.

The image sensor module 440 may comprise a cover 441. The cover 441 may cover the filter 442 and the image sensor 444. The cover 441 may comprise an upper plate portion and a side wall portion. The cover 441 may comprise a hole 441a. The hole 441a may be a hollow hole. The hole 441a may be an opening. The cover 441 may comprise a protrusion 441b. The protrusion 441b may be protruded from a lower surface of the cover 441. The protrusion 441b may be inserted into the second hole 443b of the substrate 4430 and the hole 445a of the reinforcing plate 445.

The image sensor module 440 may comprise a filter 442. The filter 442 may serve to block light of a specific frequency band from being incident on the image sensor 444 among the light passing through the lens module 210. The filter 442 may be disposed parallel to the x-y plane. The filter 442 may be disposed between the lens module 210 and the image sensor 444. The filter 442 may be disposed between the cover 441 and the substrate 443. In a modified embodiment, the filter 442 may be disposed in the hole 441a of the cover 441. Filter 442 may comprise an infrared filter. The infrared filter may absorb or reflect infrared rays incident to the infrared filter.

The image sensor module 440 may comprise a substrate 443. The substrate 443 may be an 'image sensor substrate' on which the image sensor 444 is disposed. The substrate 443 may comprise a printed circuit board (PCB). The substrate 443 may comprise a circuit board. An image sensor 444 may be disposed on the substrate 443. The substrate 443 may be coupled to the terminal portion 430. The substrate 443 may comprise a first hole 443a having a shape and size corresponding to that of the image sensor 444. The image sensor 444 may be inserted into the first hole 443a of the substrate 443. The substrate 443 may comprise a second hole 443b. The protrusion 441b of the cover 441 may be inserted into the second hole 443b of the substrate 443. The substrate 443 may comprise a terminal 443c. The terminal 443c of the substrate 443 may be disposed at each of the four side end portions on a lower surface of the substrate 443. The terminal 443c of the substrate 443 may be connected to the terminal 432 of the terminal portion 430. The substrate 443 may comprise a groove 443d. The grooves 443d of the substrate 443 may be formed in each of the four corners of the substrate 443. The first protrusion 414 of the base 410 may be avoided by the groove 443d of the substrate 443.

The image sensor module 440 may comprise an image sensor 444. The image sensor 444 may be coupled to the base 410. The image sensor 444 may move integrally with the base 410. However, the image sensor 444 is not directly coupled to the base 410, but the substrate 443 to which the image sensor 444 is coupled may be coupled to the base 410. In a modified embodiment, the image sensor 444 may be coupled directly to the base 410. The image sensor 444 may be disposed in alignment with the optical module. The image sensor 444 may have a configuration in which light passing through a lens and a filter 442 is incident, thereby forming an image. The image sensor 444 may be mounted on the substrate 443. The image sensor 444 may be electrically connected to the substrate 443. For example, the image sensor 444 may be coupled to the substrate 443 by a surface mounting technology (SMT). As another example, the image sensor 444 may be coupled to the substrate 443 by a flip chip technology. The image sensor 444 may be disposed so that the lens and the optical axis coincide. That is, the optical axis of the image sensor 444 and the optical axis of the lens may be aligned. The image sensor 444 may convert light irradiated to the effective image area of the image sensor 444 into an electrical signal. The image sensor 444 may be any one among a charge coupled device (CCD), a metal oxide semi-conductor (MOS), a CPD, and a CID.

In the present embodiment, the image sensor 444 may be rotated about the x-axis, the y-axis, and the z-axis. The image sensor 444 may move about an x-axis, a y-axis, and a z-axis. The image sensor 444 may be tilted about an x-axis, a y-axis, and a z-axis.

The image sensor module 440 may comprise a reinforcing plate 445. The reinforcing plate 445 may be disposed on a lower surface of the image sensor 444 and the substrate 443. The reinforcing plate 445 may be formed of SUS. The reinforcing plate 445 may reinforce the image sensor 444 and the substrate 443. The reinforcing plate 445 may comprise a hole 445a. The hole 445a may be coupled to the protrusion 441b of the cover 441. The reinforcing plate 445 may comprise a groove 445b. The grooves 445b may be formed in each of the four corners of the reinforcing plate 445. The groove 445b may be formed as a corner of the reinforcing plate 445 is inwardly recessed.

The camera device 10A may comprise a wire 510. The wire 510 may connect the substrate 120 and the terminal portion 430. The wire 510 may have elasticity. The wire 510 may be an elastic member. The wire 510 may be a wire spring. The wire 510 may be formed of metal. The wire 510 may be electrically connected to the image sensor 444. The wire 510 may be used as a conductive line of the image sensor 444. One end portion of the wire 510 may be coupled to the substrate 120 and the other end portion of the wire 510 may be coupled to the terminal 432. The wire 510 may elastically support the movement of the base 410.

The wire 510 may comprise a plurality of wires. The plurality of wires may comprise a number of wires corresponding to the number of terminals of the image sensor 444. The plurality of wires may comprise a total of 24 wires, 6 between adjacent corners among the 4 corners of the base.

The camera device 10A may comprise a sensor 520. The sensor 520 may be disposed on an upper surface of the substrate 120. The sensor 520 may comprise a Hall sensor (Hall IC). The sensor 520 may detect a magnetic force of the magnet 320. The movement of the image sensor 444 may be detected in real time through the magnetic force of the magnet 320 detected by the sensor 520. Through this, OIS feedback control may be possible.

The sensor 520 may comprise a plurality of sensors. The sensor 520 may comprise three sensors. All of the x-axis direction movement, the y-axis direction movement, and the rotation about z-axis of the image sensor 444 may be detected through the three sensors. The sensor 520 may comprise first to third sensors. The first sensor may face the first magnet 321, the second sensor may face the second magnet 322, and the third sensor may face the third magnet 323.

The sensor 520 may comprise a first Hall sensor that detects the movement amount and/or displacement of the magnet 320 in the x-axis direction. The sensor 520 may comprise a second Hall sensor that detects the movement amount and/or displacement of the magnet 320 in the y-axis direction. The sensor 520 may comprise a third Hall sensor that detects the movement amount and/or displacement of the magnet 320 in the x-axis direction or the amount and/or displacement of the magnet 320 in the y-axis direction. A movement of the magnet 320 rotating about the z-axis may be detected through any two or more among the first Hall sensor, the second Hall sensor, and the third Hall sensor.

The sensor 520 may comprise a first Hall sensor that detects the movement amount and/or displacement of the magnet 320 in the x-axis direction. The sensor 520 may comprise a second Hall sensor that detects the movement amount and/or displacement of the magnet 320 in the y-axis direction. The sensor 520 may comprise a third Hall sensor that detects the movement amount and/or displacement of the magnet 320 in the x-axis direction or the amount and/or displacement of the magnet 320 in the y-axis direction. A movement of the magnet 320 rotating about the z-axis may be detected through any two or more among the first Hall sensor, the second Hall sensor, and the third Hall sensor.

The housing 600 may comprise a sidewall 610. The sidewall 610 may comprise a plurality of sidewalls. The sidewall 610 may comprise four sidewalls. The housing 600 may comprise a lower portion 620. The lower portion 620 may be extended inwardly from a lower end of the sidewall 610. The lower portion 620 may comprise a hole. The lower surface of the housing 600 may be formed by a separate lower plate 630. The lower plate 630 may be understood as one configuration or a separate configuration of the housing 600. The lower plate 630 may comprise a groove 631 engaged with the protrusion 622 being protruded from a lower surface of the lower portion 620 of the housing 600.

The camera device 10A may comprise a printed circuit board (PCB) 50. The printed circuit board 50 may be electrically connected to the coil 310. The printed circuit board 50 may comprise a terminal 50a being coupled to the terminal 222 of the MEMS actuator 220. The printed circuit board 50 may comprise a hole through which the lens module 210 passes.

The camera device 10A may comprise a connector 90. The connector 90 may be electrically connected to the printed circuit board 50. The connector 90 may comprise a port for electrically connecting to an external device.

The camera device 10A may comprise a motion sensor. The motion sensor may be mounted on the printed circuit board 50. The motion sensor may be electrically connected to the control unit through a circuit pattern provided on the printed circuit board 50. The motion sensor may output rotational angular velocity information due to the movement of the camera device 10A. The motion sensor may comprise any one or more among a 2-axis gyro sensor, a 3-axis gyro sensor, and an angular velocity sensor.

The camera device 10A may comprise a control unit. The control unit may be disposed on the printed circuit board 50. The control unit may be electrically connected to the coil 310. The control unit may individually control the direction, intensity, and amplitude of the current supplied to the first to fourth coils 311, 312, 313, and 314. The control unit may control the current applied to the coil 310 and the current applied to the MEMS actuator 220 or the liquid lens 220a to perform the autofocus function and/or the hand-shake correction function. Furthermore, the control unit may perform autofocus feedback control and/or hand-shake correction feedback control.

The camera device 10A according to the present embodiment may be the one for mobile camera application. That is, it can be distinguished from a camera device for digital camera application. When miniaturizing for mobile camera application, the driving force of the VCM is relatively lowered, so there is a problem in that the current consumption increases in order to implement the three operations (X-Shift, Y-Shift, and Z-Rotation (Roll)).

The magnet 320 and the coil 310 are disposed at each corner of the base 410 being rotated 90 degrees from each other so that the magnet 320 and the coil 310 that are diagonally positioned can be assembled in the same direction. In this case, a Lorentz Force in the same direction may be generated when the image sensor 444 is driven for shift, and two pairs of rotational forces may be generated by a force in the opposite direction when the z-axis is driven for rotation.

In the present embodiment, since the four coils located at the corners require current input independent of each other, it is possible to have a system in which the power terminal of the coil 310 is separated and controlled by four channels.

That is, the present embodiment may comprise a diagonal arrangement of magnets in the same magnetic flux direction and an individual current input structure of four coils.

The present embodiment may comprise two pairs of turning force generating structures (increasing rotational moment). With a structure that generates two pairs of rotational forces, it can generate a higher rotational moment than before, and the total current consumption can be reduced when operating in three modes: X-Shift, Y-Shift, and Z-Rotation (Roll).

Simulation results for the camera device according to the present embodiment are as follows. When 'rotational moment=rotational force*distance between rotational forces=(electromagnetic force*input current)*distance between the centers of the magnet 320', and when 50 mA is applied as an input current to the coil 310 of the camera device 10A according to the present embodiment, it is confirmed that a rotational moment of {(0.094 mN/mA×50 mA)×12.14 mm}×2=114.1 mN·mm is generated.

In the present embodiment, hand-shake correction for the image sensor 444 and hand-shake correction for a corresponding lens can be performed together. For example, when hand-shake correction is performed only with the MEMS actuator 220 or the liquid lens 220a, positive (+) distortion may occur at the edge of the image obtained from the image sensor 444. Meanwhile, when only the image sensor 444 is moved to perform hand-shake correction, negative (−) distortion may occur at the edge of the image obtained from the image sensor 444. In the present embodiment, distortion occurring at the edge of the image can be minimized by performing hand-shake correction for the image sensor 444 and hand-shake correction in the MEMS actuator 220 or the liquid lens 220a together. In the present embodiment, the hand-shake correction function may be performed on the lens side through the MEMS actuator 220 or the liquid lens 220a and the image sensor 444 can be moved in response thereto. Through this, it is possible to provide a level of hand-shake correction corresponding to the module movement method, which is a method in which the lens and the image sensor 444 move integrally. However, even in the present embodiment, the MEMS actuator 220 or the liquid lens 220a may provide only the AF function and may perform the OIS function through the movement of the image sensor 444.

Hereinafter, an optical device according to the present embodiment will be described with reference to the drawings.

Figure 19:
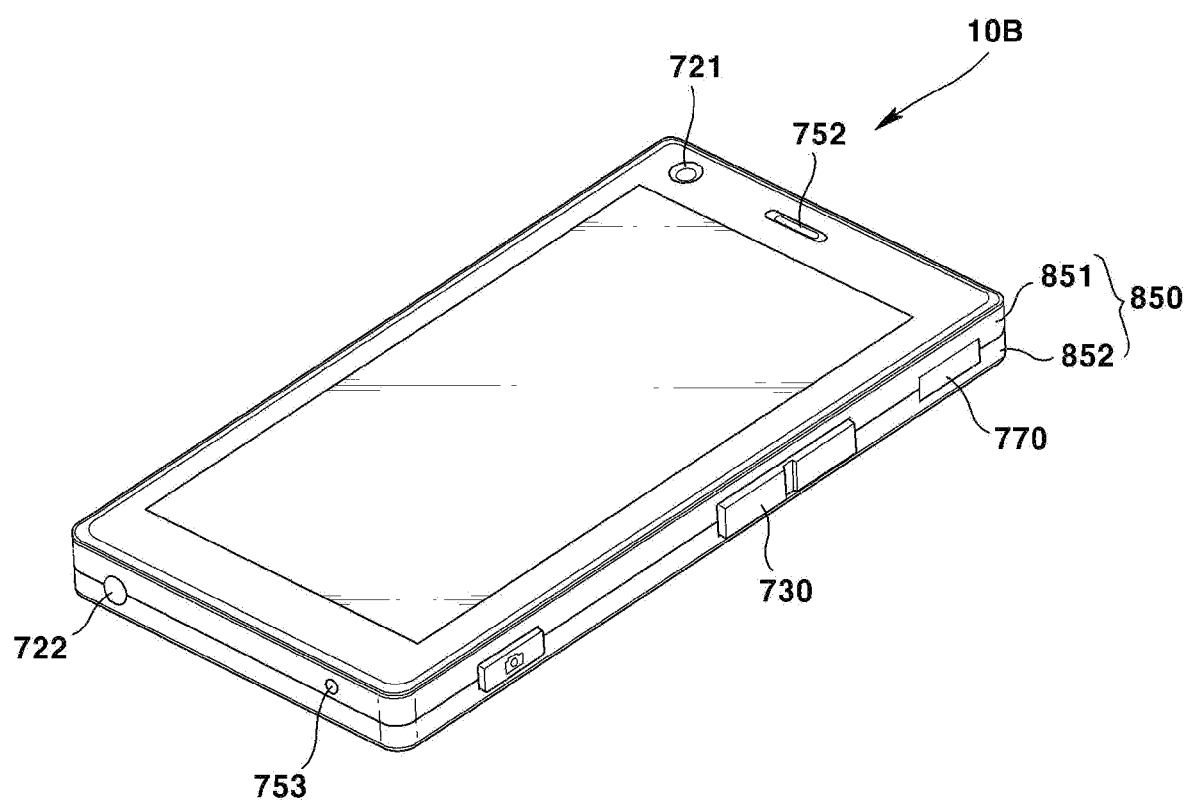
FIG. 19 is a perspective view of an optical device according to the present embodiment.
Figure 20:
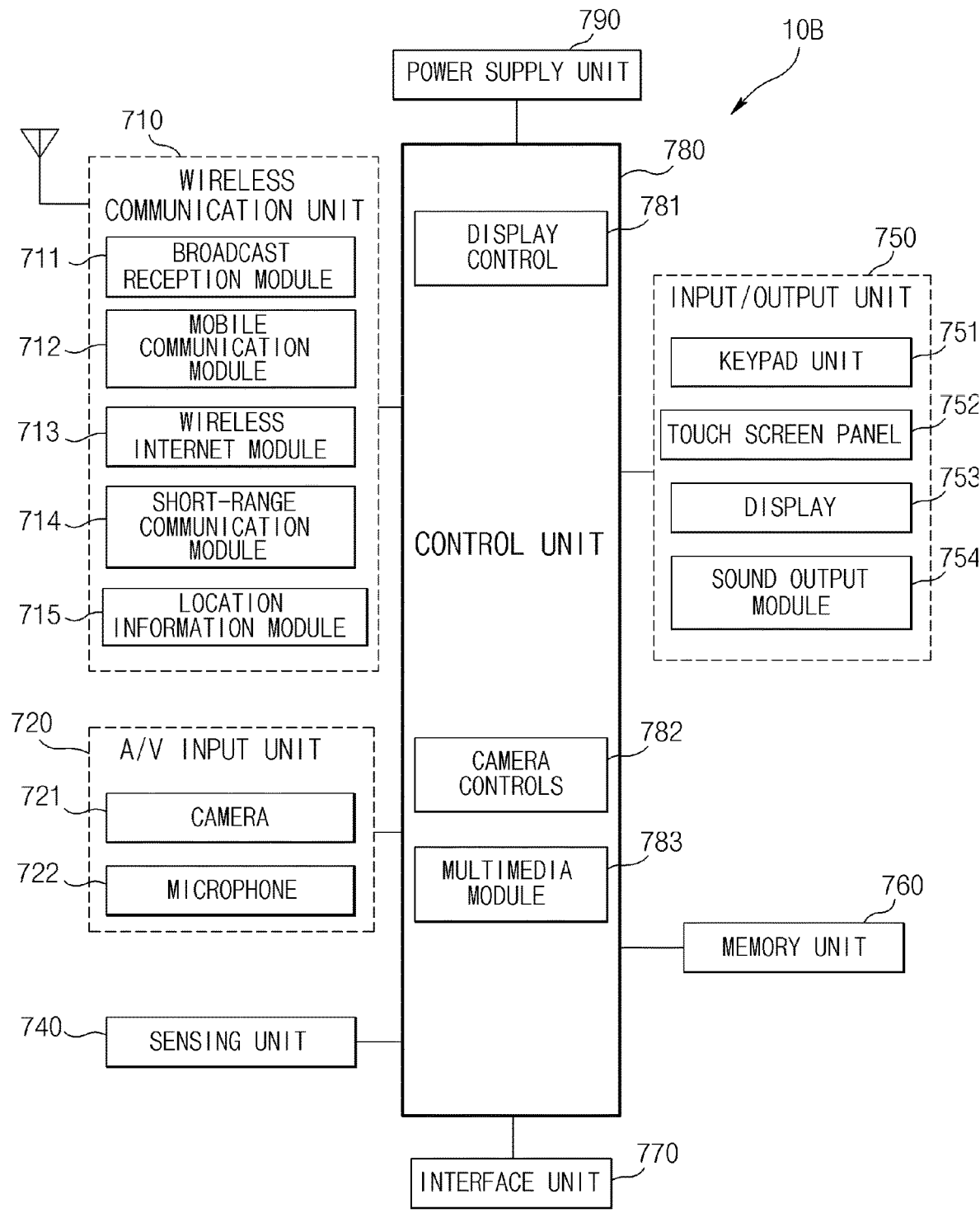
FIG. 20 is a block diagram of an optical device illustrated in FIG. 19.

FIG. 19 is a perspective view of an optical device according to the present embodiment, and FIG. 20 is a block diagram of an optical device illustrated in FIG. 19.

The optical device 10B may be any one among a mobile phone, a mobile phone, a smart phone, a portable smart device, a digital camera, a laptop computer, a digital broadcasting terminal, a PDA (Personal Digital Assistants), a PMP (Portable Multimedia Player), and a navigation device. However, the type of the optical device 10B is not limited thereto, and any device for photographing an image or a picture may be comprised in the optical device 10B.

The optical device 10B may comprise a main body 850. The main body 850 may have a bar shape. Alternatively, the main body 850 may have various structures such as a slide type, a folder type, a swing type, a swivel type, in which two or more sub-bodies are coupled to be relatively movable. The main body 850 may comprise a case (casing, housing, and cover) forming an outer appearance. For example, the main body 850 may comprise a front case 851 and a rear case 852. In a space formed between the front case 851 and the rear case 852, various electronic components of the optical device 10B can be embedded. A display 751 may be disposed on one surface of the main body 850. A camera 721 may be disposed on one or more surfaces of one surface of the main body 850 and the other surface disposed opposite to the one surface.

The optical device 10B may comprise a wireless communication unit 710. The wireless communication unit 710 may comprise one or more modules that enable wireless communication between the optical device 10B and the wireless communication system or between the optical device 10B and the network in which the optical device 10B is located. For example, the wireless communication unit 710 may comprise any one or more among a broadcast reception module 711, a mobile communication module 712, a wireless Internet module 713, a short-range communication module 714, and a location information module 715.

The optical device 10B may comprise an A/V input unit 720. The audio/video (A/V) input unit 720 is for inputting an audio signal or a video signal, and may comprise any one or more of a camera 721 and a microphone 722. At this time, the camera 721 may comprise the camera device 10A according to the present embodiment.

The optical device 10B may comprise a sensing unit 740. The sensing unit 740 can generate a sensing signal for controlling the operation of the optical device 10B by detecting the current state of the optical device 10B such as the opening/closing state of the optical device 10B, the position of the optical device 10B, the presence or absence of user contact, the orientation of the optical device 10B, acceleration/deceleration of the optical device 10B, and the like. For example, when the optical device 10B is in the form of a slide phone, it is possible to sense whether the slide phone is opened or closed. In addition, it may be responsible for a sensing function related to whether the power supply unit 790 is supplied with power, whether the interface unit 770 is coupled to an external device, and the like.

The optical device 10B may comprise an input/output unit 750. The input/output unit 750 may be a configuration for generating an input or output related to visual, auditory, or tactile sense. The input/output unit 750 may generate input data for controlling the operation of the optical device 10B, and may also output information processed by the optical device 10B.

The input/output unit 750 may comprise any one or more among a keypad unit 730, a display 751, a sound output module 752, and a touch screen panel 753. The keypad unit 730 may generate input data in response to a keypad input. The display 751 may output an image photographed by the camera 721. The display 751 may comprise a plurality of pixels whose color changes according to an electrical signal. For example, the display 751 may comprise at least one among a liquid crystal display, a thin film transistor-liquid crystal display, an organic light-emitting diode, a flexible display, or a three-dimensional display (3D display). The sound output module 752 may output audio data received from the wireless communication unit 710 in a call signal reception, a call mode, a recording mode, a voice recognition mode, or a broadcast reception mode, or may output audio data stored in the memory unit 760. The touch screen panel 753 may convert a change in capacitance generated due to a user's touch on a specific area of the touch screen into an electrical input signal.

The optical device 10B may comprise a memory unit 760. The memory unit 760 may store a program for processing and controlling the control unit 780. In addition, the memory unit 760 may store input/output data, for example, any one or more among a phone book, a message, an audio, a still image, a photo, and a video. The memory unit 760 may store an image photographed by the camera 721, for example, a photo or a video.

The optical device 10B may comprise an interface unit 770. The interface unit 770 serves as a passage for connecting to an external device connected to the optical device 10B. The interface unit 770 may receive data from an external device, receive power and transmit it to each component inside the optical device 10B, or transmit data inside the optical device 10B to an external device. The interface unit 770 may comprise any one or more among a wired/wireless headset port, an external charger port, a wired/wireless data port, a memory card port, a port for connecting a device equipped with an identification module, and an audio input/output (I/O) port, a video input/output (I/O) port, and an earphone port.

The optical device 10B may comprise a control unit 780. The control unit 780 may control the overall operation of the optical device 10B. The control unit 780 may perform related control and processing for voice call, data communication, video call, and the like. The control unit 780 may comprise a multimedia module 781 for playing multimedia. The multimedia module 781 may be provided inside the control unit 780 or may be provided separately from the control unit 780. The control unit 780 may perform a pattern recognition process capable of recognizing a handwriting input or a drawing input performed on the touch screen as characters and images, respectively.

The optical device 10B may comprise a power supply unit 790. The power supply unit 790 may receive external power or internal power under the control of the control unit 780 to supply power required for operation of each component.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:
1. A camera device, comprising:
a fixed portion;
a moving portion spaced apart from the fixed portion and comprising an image sensor; and
a driving portion configured to move the moving portion with respect to the fixed portion,
wherein the driving portion comprises a coil and a magnet,
wherein the magnet comprises first and third magnets opposite to each other based on an optical axis, and second and fourth magnets opposite to each other based on the optical axis,
wherein the coil comprises a first coil facing the first magnet, a second coil facing the second magnet, a third coil facing the third magnet, and a fourth coil facing the fourth magnet,
wherein, by an interaction between the first to fourth magnets and the first to fourth coils, the moving portion moves in an x-axis direction perpendicular to the optical axis or a y-axis direction perpendicular to the optical axis or rotates about the optical axis,
wherein the first and third coils are configured to move the moving portion in the x-axis direction or rotate, wherein the second and fourth coils are configured to move the moving portion in the y-axis direction or rotate,
wherein the first coil is not overlapped with the third coil in both the x-axis direction and the y-axis direction, and
wherein the second coil is not overlapped with the fourth coil in both the x-axis direction and the y-axis direction.

2. The camera device of claim 1, comprising a lens disposed at a position corresponding to the image sensor,
wherein the lens is fixed to the fixed portion.

3. The camera device of claim 2, comprising an optical module disposed on the lens and configured to perform an auto focus function.

4. A camera device of claim 1, wherein the fixed portion comprises a holder and a substrate disposed on the holder;
wherein the moving portion comprises a base disposed to be spaced apart from the holder;
wherein the image sensor is coupled to the base,
wherein the coil is disposed on the substrate, and
wherein the magnet is disposed on the base.

5. A camera device of claim 4, wherein the substrate comprises first to fourth corners,
wherein the first coil is disposed on the first corner of the substrate,
wherein the second coil is disposed on the second corner of the substrate,
wherein the third coil is disposed on a third corner of the substrate, and
wherein the fourth coil is disposed on the fourth corner of the substrate.

6. A camera device of claim 1, wherein a long side of the first coil and a long side of the third coil are disposed parallel to each other,
wherein a long side of the second coil and a long side of the fourth coil are disposed parallel to each other, and
wherein the long side of the first coil and the long side of the second coil are disposed not to be parallel to each other.

7. The camera device of claim 6, wherein the long side of the first coil and the long side of the second coil are disposed such that virtual extension lines thereof are orthogonal to each other.

8. The camera device of claim 1, wherein currents are independently applied to at least three coils among the first to fourth coils.

9. The camera device of claim 1, wherein the first to fourth coils are electrically separated from each other.

10. The camera device of claim 4, comprising:
a terminal portion disposed on the base and comprising a terminal electrically connected to a terminal of the image sensor; and
a plurality of wires connecting the substrate and the terminal portion.

11. The camera device of claim 10, comprising:
an image sensor substrate disposed with the image sensor,
wherein the image sensor substrate is coupled to the terminal portion and the terminal portion is coupled to the base so that the image sensor is coupled to the base.

12. The camera device of claim 10, wherein the plurality of wires comprises a number of wires corresponding to the number of terminals of the image sensor.

13. The camera device of claim 12, wherein the plurality of wires comprises a total of twenty four wires, each six wires between adjacent corners among four corners of the base.

14. The camera device of claim 5, wherein the first magnet is disposed on a first corner of the base,
wherein the second magnet is disposed on a second corner of the base,
wherein the third magnet is disposed on a third corner of the base,
wherein the fourth magnet is disposed on a fourth corner of the base,
wherein the first magnet is not overlapped with the third magnet in both the x-axis direction and the y-axis direction, and
wherein the second magnet is not overlapped with the fourth magnet in both the x-axis direction and the y-axis direction.

15. An optical device, comprising:
a main body;
the camera device of claim 1 disposed on the main body; and
a display disposed on the main body and configured to output an image photographed by the camera device.

16. A camera device, comprising:
a holder assembly;
a base assembly spaced apart from the holder assembly and comprising an image sensor; and
a driving portion configured to move the base assembly with respect to the holder assembly,
wherein the driving portion comprises a coil and a magnet,
wherein the magnet comprises first and third magnets opposite to each other based on an optical axis, and second and fourth magnets opposite to each other based on the optical axis,
wherein the coil comprises a first coil facing the first magnet, a second coil facing the second magnet, a third coil facing the third magnet, and a fourth coil facing the fourth magnet,
wherein, by an interaction between the first to fourth magnets and the first to fourth coils, the base assembly moves in an x-axis direction perpendicular to the optical axis or a y-axis direction perpendicular to the optical axis or rotates about the optical axis,
wherein the first and third coils are configured to move the base assembly in the x-axis direction or rotate,
wherein the second and fourth coils are configured to move the base assembly in the y-axis direction or rotate,
wherein the first magnet is not overlapped with the third magnet in both the x-axis direction and the y-axis direction, and
wherein the second magnet is not overlapped with the fourth magnet in both the x-axis direction and the y-axis direction.

17. The camera device of claim 16, wherein the holder assembly comprises a lens and an optical module disposed on the lens and configured to perform an auto focus function.

18. The camera device of claim 16, wherein a long side of the first coil and a long side of the third coil are disposed parallel to each other,
wherein a long side of the second coil and a long side of the fourth coil are disposed parallel to each other, and
wherein the long side of the first coil and the long side of the second coil are disposed not to be parallel to each other.

19. The camera device of claim 16, wherein the first to fourth coils are electrically separated from each other.

20. The camera device of claim 16, comprising a plurality of wires configured to elastically support a movement of the base assembly.

* * * * *